United States Patent
Tabata et al.

(10) Patent No.: US 9,873,304 B2
(45) Date of Patent: Jan. 23, 2018

(54) STABILIZER

(71) Applicant: TOYOTA JIDOSHA KABUSHIKI KAISHA, Toyota-shi, Aichi (JP)

(72) Inventors: Masaaki Tabata, Nagoya (JP); Takanobu Fukuoka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 253 days.

(21) Appl. No.: 14/982,826

(22) Filed: Dec. 29, 2015

(65) Prior Publication Data
US 2016/0200164 A1    Jul. 14, 2016

(30) Foreign Application Priority Data

Jan. 13, 2015 (JP) .................................. 2015-004078

(51) Int. Cl.
*B60G 17/016* (2006.01)
*B60G 21/073* (2006.01)
*B60G 21/055* (2006.01)

(52) U.S. Cl.
CPC ..... *B60G 21/0553* (2013.01); *B60G 17/0162* (2013.01); *B60G 21/073* (2013.01); *B60G 2202/135* (2013.01); *B60G 2202/413* (2013.01); *B60G 2204/62* (2013.01); *B60G 2204/80* (2013.01); *B60G 2206/0116* (2013.01); *B60G 2400/51* (2013.01); *B60G 2800/012* (2013.01); *B60G 2800/9122* (2013.01)

(58) Field of Classification Search
CPC ............ B60G 21/0553; B60G 17/0162; B60G 2202/135; B60G 2202/413; B60G 2204/80; B60G 2400/41; B60G 2800/012; B60G 2800/9122

USPC .............................. 701/38; 280/5.511, 5.506
See application file for complete search history.

(56) References Cited

U.S. PATENT DOCUMENTS 3,396,984 A * 8/1968 Cadiou ................ B60G 17/033
                                                        280/5.509
4,966,390 A * 10/1990 Lund .................. B60G 17/0162
                                                        280/124.161

(Continued)

FOREIGN PATENT DOCUMENTS

JP    S59-23715 A     2/1984
JP    S60-152514 U   10/1985

(Continued)

OTHER PUBLICATIONS

Feb. 8, 2016 Office Action issued in Japanese Patent Application No. 2015-004078.

*Primary Examiner* — Ruth Ilan
(74) *Attorney, Agent, or Firm* — Oliff PLC

(57) ABSTRACT

A stabilizer includes a stabilizer bar, left and right cylinders, a parallel pipe, a cross pipe, a parallel on-off valve, and a valve controller. The parallel on-off valve maintains communication between a left side first fluid room of the left cylinder and a right side first fluid room of the right cylinder and maintains communication between a left side second fluid room of the left cylinder and a right side second fluid room of the right cylinder by opening itself. The parallel on-off valve cuts off the communication by closing itself. The valve controller switches an opening/closing state of the parallel on-off valve based on a running state of a vehicle or an operation state of the vehicle by a driver.

5 Claims, 11 Drawing Sheets

(56) References Cited

U.S. PATENT DOCUMENTS

| | | | | |
|---|---|---|---|---|
| 5,794,966 A * | 8/1998 | MacLeod | ............. | B60G 21/067 |
| | | | | 280/124.104 |
| 5,941,334 A * | 8/1999 | Inagaki | .............. | B60G 17/0195 |
| | | | | 180/242 |
| 7,600,770 B2 * | 10/2009 | Walentowski | ......... | B60G 11/27 |
| | | | | 280/124.13 |
| 7,789,398 B2 * | 9/2010 | Munday | ................ | B60G 21/06 |
| | | | | 280/124.16 |
| 7,862,052 B2 * | 1/2011 | Germain | ............ | B60G 21/0555 |
| | | | | 280/124.159 |
| 2009/0020964 A1 * | 1/2009 | Germain | ............ | B60G 21/0555 |
| | | | | 280/5.506 |
| 2009/0020966 A1 | 1/2009 | Germain | | |

FOREIGN PATENT DOCUMENTS

| | | |
|---|---|---|
| JP | H06-3707 U | 1/1994 |
| JP | 2007-045197 A | 2/2007 |
| JP | 2009-023650 A | 2/2009 |
| JP | 2013-112328 A | 6/2013 |

\* cited by examiner

STABILIZER

BACKGROUND OF THE INVENTION

1. Field of the Invention

The present invention relates to a stabilizer comprising a stabilizer bar interposed between left-and-right wheels and a vehicle body and a cylinder for varying function of the stabilizer bar.

2. Description of the Related Art

Japanese Unexamined Utility Model Application Publication No. 06-3707 discloses a stabilizer which comprises a left cylinder and a right cylinder. The left cylinder is disposed between the left end of the stabilizer bar and a left wheel. The right cylinder is disposed between the right end of the stabilizer bar and a right wheel. Each of the left and right cylinders extends vertically. In this stabilizer, each of the left and right cylinders is divided into an upper room and a lower room by a piston. The upper room of the left cylinder and the upper room of the right cylinder are communicated with each other through an upper communication passage, while the lower room of the left cylinder and the lower room of the right cylinder are communicated with each other through a lower communication passage. Hereinafter, such a connection between the left and right cylinders via the communication passages is referred to as a parallel connection.

In the stabilizer, when one of the left wheel and the right wheel moves upward and the other of them moves downward, the piston of the cylinder provided to the one wheel moves upward so that hydraulic oil flows from the upper room of the cylinder provided to the one wheel into the upper room of the cylinder provided to the other wheel. At the same time, the piston of the cylinder provided to the other wheel moves downward so that the hydraulic oil flows from the lower room of the cylinder provided to the other wheel into the lower room of the cylinder provided to the one wheel. Thus, torsional force is hard to be transmitted to the stabilizer bar to weaken/diminish stabilizing function of the stabilizer bar (the stabilizer's function for generating reaction force).

SUMMARY OF THE INVENTION

The stabilizer is effective in a situation where a road surface following performance of the wheels is required. In other words, when a road-hugging/holding property is required (that is, when the left-and-right wheels should be made to touch the ground so as not to be away from the road surface), the stabilizer's function is effective. However, in a situation where the vehicle is required to reduce its roll angle (for example, when the vehicle is turning), the stabilizer has a disadvantage because its stabilizing function is weak.

Japanese Unexamined Patent Application Publication No. 2009-23650 discloses another type of a stabilizer. This stabilizer has a structure Where an upper room of a left cylinder and a lower room of a right cylinder are communicated with each other via a communication passage, and a lower room of the left cylinder and an upper room of the right cylinder are communicated with each other via another communication passage. Hereinafter, such a connection between the left and right cylinders via the communication passages will be referred to as a cross connection.

When the vehicle with the cross connection turns, a pressure of the upper room of the cylinder which is provided to an outer wheel increases because a force acted onto the outer wheel increases, and at the same time, a pressure of the lower room of the cylinder which is provided to an inner wheel increases because a force acted onto the inner wheel decreases. In this case, the left and right cylinders do not extend and contract due to a pressure balance between the upper room of the cylinder provided to the outer wheel and the lower room of the cylinder provided to the inner wheel. Thus, it becomes possible to transmit a torsion force to the stabilizer bar from the wheels effectively so that the roll angle of the vehicle can be decreased.

However, the stabilizer of Japanese Unexamined Patent Application Publication No. 2009-23650 has a disadvantage in a situation where the road surface following performance is required, because the stabilizer does not allow the wheels to have a large vertical stroke.

As mentioned above, both the stabilizer with the parallel connection and the stabilizer with the cross connection may not realize/provide a stabilizing function suitable for a driving state of the vehicle or a stabilizing function a driver requires/desires.

SUMMARY OF THE INVENTION

The present invention has been made to cope with the above problems, and has an object to provide a stabilizer which can realize the stabilizing function suitable for a driving state of the vehicle or the stabilizing function a driver requires.

In order to achieve the object, the present invention comprises:

a stabilizer bar (40) provided between left-and-right wheels and a vehicle body; and a cylinder device (50, 150) including a left cylinder (51L, 151L) and a right cylinder (51R, 151R). The left cylinder and the right cylinder are disposed between the stabilizer bar and the vehicle body, at a left side and a right side in a vehicle width direction, respectively, and extend and contract when the stabilizer bar and the vehicle body vertically move relatively to each other. Alternatively, the left cylinder is disposed between the stabilizer bar and the left wheel to extend and contract when the stabilizer bar and the left wheel vertically move relatively to each other, and the right cylinder is disposed between the stabilizer bar and the right wheel to extend and contract when the stabilizer bar and the right wheel vertically move relatively to each other.

The left cylinder (51L, 151L) includes a left side first fluid room (531L) and a left side second fluid room (532L) which are partitioned by a left piston (54L), wherein the left side first fluid room is compressed by the left piston upon the left cylinder contracting, and the left side first fluid room is expanded by the left piston upon the left cylinder extending, and wherein the left side second fluid room is compressed by the left piston upon the left cylinder extending, and the left side second fluid room is expanded by the left piston upon the left cylinder contracting.

The right cylinder (51R, 151R) includes a right side first fluid room (531R) and a right side second fluid room (532R) which are partitioned by a right piston (54R). wherein the right side first fluid room is compressed by the right piston upon the right cylinder contracting, and the right side first fluid room is expanded by the right piston upon the right cylinder extending, and wherein the right side second fluid room is compressed by the right piston upon the right cylinder extending, and the right side second fluid room is expanded by the right piston upon the right cylinder contracting.

The stabilizer further comprising:

a parallel pipe (61, 62) communicating the left side first fluid room and the right side first fluid room, the parallel pipe communicating the left side second fluid room and the right side second fluid room;

a cross pipe (63, 64) communicating the left side first fluid room and the right side second fluid room, the cross pipe communicating the left side second fluid room and the right side first fluid room;

a parallel on-off valve (81, 82) which maintains a first communication between the left side first fluid room and the right side first fluid room and a second communication between the left side second fluid room and the right side second fluid room when opened, and which cuts off the first communication and the second communication when closed; and a valve controller (90) switching an opening/closing state of the parallel on-off valve based on a running state of the vehicle or an operation state of the vehicle by a driver.

The stabilizer of the present invention comprises the stabilizer bar and the cylinder device. The stabilizer bar is disposed between "the left and right wheels" and "the vehicle body", and produces a torsional reaction force. The cylinder device includes the left cylinder and the right cylinder. The left cylinder is disposed between the stabilizer bar and the vehicle body at the left side in the vehicle width direction. The right cylinder is disposed between the stabilizer bar and the vehicle body at the right side in the vehicle width direction. The left cylinder and the right cylinder extend and contract when the stabilizer bar and the vehicle body vertically move relatively to each other. Alternatively, the left cylinder is disposed between the stabilizer bar and the left wheel to extend and contract when the stabilizer bar and the left wheel vertically move relatively to each other. The right cylinder is disposed between the stabilizer bar and the right wheel to extend and contract when the stabilizer bar and the right wheel vertically move relatively to each other.

The left cylinder includes the left side first fluid room and the left side second fluid room. They are partitioned by the left piston (piston provided in the left cylinder). The left side first fluid room is compressed by the left piston when the left cylinder contracts. The left side first fluid room is expanded by the left piston when the left cylinder extends. The left side second fluid room is compressed by the left piston when the left cylinder extends. The left side second fluid room is expanded by the left piston when the left cylinder. The right cylinder includes the right side first fluid room and the right side second fluid room. They are partitioned by the right piston (piston provided in the right cylinder). The right side first fluid room is compressed by the right piston when the right cylinder contracts. The right side first fluid room is expanded by the right piston when the right cylinder extends. The right side second fluid room is compressed by the right piston when the right cylinder extends. The right side second fluid room is expanded by the right piston when the right cylinder contracts.

The stabilizer comprises the parallel pipe and the cross pipe. The parallel pipe communicates with both of the left side first fluid room and the right side first fluid room, and the parallel pipe communicates with both of the left side second fluid room and the right side second fluid room. The cross pipe communicates with both of the left side first fluid room and the right side second fluid room, and the cross pipe communicates with both of the left side second fluid room and the right side first fluid room.

The stabilizer comprises the parallel on-off valve and the valve controller. The parallel on-off valve maintains the communication between the left side first fluid room and the right side first fluid room, and maintains the communication between the left side second fluid room and the right side second fluid room, when it opens. The parallel on-off valve cuts off those communications when it closes.

The valve controller switches/changes the opening/closing state of the parallel on-off valve based on the running state of the vehicle or the operation state of the vehicle by the driver. For example, if the parallel on-off valve is opened, the hydraulic oil in the left and right cylinders can flow through the parallel pipe. Thus, the left and right cylinders are communicated with each other via the parallel pipe and the cross pipe, and are able to freely extend and contract in response to an input from a road surface. Therefore, the input from the road surface can be absorbed by the extension and contraction of the cylinders, and thereby, the stabilizer bar can be difficult to be twisted. As a result, the stabilizer cannot perform the stabilizing function (cannot produce the returning reaction force).

If the parallel on-off valve is closed, the hydraulic oil in the left and right cylinders cannot flow through the parallel pipe. Thus, for example, when an input is exerted onto the left wheel from a road surface and another input having opposite phase to the input exerted onto the left wheel is exerted onto the right wheel from the road surface, in other words, when an input from the road surface which increases a load exerted onto one of the left and right wheels and which decreases a load exerted onto the other of the left and the right wheels, extending and contracting action of the left and right cylinders can be suppressed, because the pressure of the left side first fluid room and the pressure of the right side second fluid room become balanced, and the pressure of the left side second fluid room and the pressure of the right side first fluid room become balanced by the cross pipe. Therefore, the input, having the opposite phase, from the road surface is transmitted to the stabilizer bar, whereby the stabilizer bar is twisted. As a result, the stabilizer can perform the stabilizing function (can produce the returning reaction force).

Therefore, according to the present invention, the stabilizer can be switched between a state where the stabilizer realizes the stabilizing function and another state where the stabilizer does not realize the stabilizing function based on (in response to) the driving state of the vehicle or the operation state by the driver. For example, if the stabilizer realizes the stabilizing function when the vehicle is turning, and the stabilizer does not realize the stabilizing function when the vehicle is not turning, it is possible to maintain posture of the vehicle stably (reduces the roll angel of the vehicle) when the vehicle is turning and to improve the ride quality/comfort of the vehicle when the vehicle is running straight. Additionally, the driver can switch between the state where the stabilizer realizes the stabilizing function and another state where the stabilizer does not realize the stabilizing function. Thus, according to the present invention, it is possible to realize the stabilizing function suitable for the running states of the vehicle or the stabilizing function that the driver requires/hopes.

In one of aspects of the present invention, a flow resistance of the parallel pipe is smaller than that of the cross pipe.

According to the aspect described above, when the parallel on-off valve is opened (or made in the opened state), a larger amount of the hydraulic oil can be made to flow through the parallel pipe than through the cross pipe. Therefore, the left and right cylinders can be made to easily extend and contract in an opposite direction to each other so that the stabilizer does not perform the stabilizing function. Furthermore, the left and right wheels can be made to freely stroke vertically, and thus, a road-hugging (road-holding) property of the wheels is improved. It should be noted that the flow resistance can be adjusted by making/providing a difference between an internal diameter of the parallel pipe and an internal diameter of the cross pipe, or making/providing a difference between an internal diameter of an orifice provided in the parallel pipe and an internal diameter of an orifice provided in the cross pipe.

The stabilizer may comprise an accumulator (70) which is communicated with the parallel pipe and which absorbs pressure variation/fluctuation of the hydraulic oil in the cylinder device; and an on-off valve (83) for accumulator which maintains a third communication between the accumulator and the parallel pipe by opening itself and which cuts off the third communication by closing itself.

The stabilizer according to one of aspects of the present invention comprises the accumulator and the on-off valve for accumulator. The accumulator is communicated with the parallel pipe, and absorbs pressure variation of the hydraulic oil in the cylinder device. The on-off valve for accumulator maintains the communication between the accumulator and the parallel pipe when it is opened, and terminates the communication between the accumulator and the parallel pipe when it is closed.

Accordingly, the pressure variation/fluctuation of the hydraulic oil in the left and right cylinders caused by extension and contraction of the left and right cylinders can be absorbed by the accumulator when the on-off valve for accumulator is in the opened state. Therefore, the left and right cylinders can be extend and contract more freely. For example, it is preferable to make the left and right cylinders in a state where they can extend and contract freely when the vehicle runs straight on an on-road. Thus, the on-off valve for accumulator is preferably made to be in the opened state, when the vehicle runs straight on an on-road.

On the other hand, when the on-off valve for accumulator is in the closed state, the hydraulic oil does not flow into the accumulator. Therefore, the left and right cylinders become easy to make their extending and contracting action cooperate with each other. For example, when an input from a road surface is exerted onto the left wheel and another input from a road surface having an opposite phase to the input exerted onto the left wheel is exerted onto the right wheel in a case where the vehicle runs on an off-road, it is possible to push one of the wheels whose grounding force is smaller than the other wheel toward the road surface by making the left and right cylinders extend and contract in opposite directions. Thus, the road-hugging/road-holding property of the wheels is improved.

The stabilizer may comprise a turning determination means (S13, S14) for determining whether the vehicle is turning or not. The valve controller may be configured to make the parallel on-off valve in a closed state upon the turning determination means determining that the vehicle is turning (S15, S26), and may be configured to make the parallel on-off valve in an opened state upon the turning determination means determining that the vehicle is not turning (S16, S25).

In one of the aspects of the present invention, the turning determination means determines whether the vehicle is turning or not. The valve controller closes the parallel on-off valve when the turning determination means determines that the vehicle is turning. When the parallel on-off valve is closed (in the closed state), the hydraulic oil in the left and right cylinders cannot flow through the parallel pipe. Therefore, when an input from a road surface is exerted onto the left wheel and another input from the road surface having opposite phase to the input exerted onto the left wheel is exerted onto the right wheel, in other words, when the input from the road surface is exerted, which increases a load exerted onto one of the left and right wheels and which decreases a load exerted onto the other of the left and the right wheels, extending and contracting action of the left and right cylinders can be suppressed, because the pressure of the left side first fluid room and the pressure of the right side second fluid room become equal to each other (balanced), and the pressure of the left side second fluid room and the pressure of the right side first fluid room become equal to each other (balanced). Therefore, the input from the road surface is transmitted to the stabilizer bar, the stabilizer bar is twisted. As a result, the stabilizer can perform the stabilizing function, and the roll angle of the vehicle can be reduced.

The left and right cylinders are not fully locked. Therefore, in a case where a vertical load is exerted onto the wheels temporarily due to protrusions of the road or recesses of the road, the pressure between the left and right cylinders becomes unbalanced, and thus, the hydraulic oil flows through the cross pipe. As a result, the left and right cylinders extend and contract, whereby the input from the road surface can be absorbed by the left and right cylinders. Therefore, it is possible to absorb an impact transmitted to the vehicle body from the road surface, and thus, the ride quality/comfort of the vehicle is improved.

The valve controller makes the parallel on-off valve in the opened state when the turning determination means determines that the vehicle is not turning. When the parallel on-off valve is in the opened state (opened), the hydraulic oil of the left and right cylinders can flow through the parallel pipe. Therefore, the left and right cylinders become a state where they can freely extend and contract by an input from the road surface. Accordingly, the input from the road surface can be absorbed by the extension and contraction of the cylinders, and the stabilizer bar can be difficult to be twisted. As a result, the stabilizer cannot perform the stabilizing function.

The stabilizer bar produces the torsional reaction force if the stabilizer bar is twisted by the temporal input from the road surface while the vehicle is running straight. In this case, the vehicle body slowly oscillates in a roll direction due to an elasticity of the stabilizer bar. In contrast, according to the aspect of the present invention, the input from the road surface can be adsorbed owing to the extension and contraction of the cylinders, whereby the stabilizer bar becomes difficult to be twisted. Therefore, the vehicle becomes difficult to oscillate in the roll direction, and thus, the ride quality/comfort of the vehicle is improved.

Therefore, the aspect of the present invention can maintain the stable posture of the vehicle (can reduce the roll angel of the vehicle) when the vehicle is turning, and can improve the ride quality/comfort of the vehicle when the vehicle is running straight.

The stabilizer may comprise a turning determination means for determining whether the vehicle is turning or not (S13, S14). The valve controller may be configured to make each of the parallel on-off valve and the on-off valve for accumulator in the closed state when the turning determination means determines that the vehicle is turning (S15), and may be configured to make each of the parallel on-off valve and the on-off valve for accumulator in the opened state when the turning determination means determines that the vehicle is not turning (S16).

In the aspect described above, the valve controller closes the parallel on-off valve and the on-off valve for accumulator when the turning determination means determines that the vehicle is turning. Therefore, the hydraulic oil of the left and right cylinders cannot flow into the parallel pipe and the accumulator. As a result, it is possible to suppress extending and contracting action of the left and right cylinders. Therefore, one input from the road surface to the left wheel and the other input from the road surface to the right wheel, those having opposite phase to each other, are transmitted to the stabilizer bar, whereby the stabilizer bar is twisted. As a result, the stabilizer can perform the stabilizing function, and the roll angle of the vehicle is reduced.

On the other hand, the valve controller opens the parallel on-off valve and the on-off valve for accumulator when the turning determination means determines that the vehicle is not turning. Therefore, the hydraulic oil of the left and right cylinders can flow through the parallel pipe and flow into the accumulator. As a result, the left and right cylinders can freely extend and contract by an input from a road surface. Therefore, the input from the road surface can be absorbed owing to the extension and contraction of the cylinders and an action of the accumulator. Thus, the stabilizer bar becomes more difficult to be twisted. Consequently, the stabilizer cannot perform the stabilizing function. Additionally, a thermal expansion and a thermal contraction of the hydraulic oil can be absorbed by the accumulator.

Therefore, the aspect of the present invention can maintain the stable posture of the vehicle (can reduce the roll angel of the vehicle) when the vehicle turns and to improve the ride quality/comfort of the vehicle when the vehicle runs straight.

The stabilizer may comprise an off-road running presumption means (S11, S12) for presuming (presumably determining) whether the vehicle is running on an off-road or not. The valve controller may be configured to make the parallel on-off valve in an opened state and to make the on-off valve for accumulator in a closed state when the off-road running presumption means presumes that the vehicle is running on an off-road (S17). In addition, the flow resistance of the parallel pipe may be designed to be smaller than that of the cross pipe.

In the above aspect of the present invention, the off-road running presumption means presumes (presumably determines) whether the vehicle is running on an off-road or not. The valve controller opens the parallel on-off valve, and closes the on-off valve for accumulator, when the off-road running presumption means presumes that the vehicle is running on an off-road. When the parallel on-off valve is in the opened state (opened), the hydraulic oil of the left and right cylinders can flow through the parallel pipe. As a result, the left and right cylinders can freely extend and contract by the input from the road surface. As a result, the stabilizer cannot perform the stabilizing function.

The flow resistance of the parallel pipe is smaller than that of the cross pipe. Therefore, a larger amount of the hydraulic oil can flow through the parallel pipe, by the extension and contraction of the cylinders. Additionally, the pressure variation/fluctuation of the hydraulic oil which is caused by the extension and contraction of the cylinders is not absorbed by the accumulator, because the on-off valve for accumulator is closed. Therefore, the pressure variation/fluctuation of the hydraulic oil caused by the extension and contraction of one of the cylinders can be transmitted to the other of the cylinders effectively. Thus, when the one cylinder extends or contracts, the other cylinder can contract or extend in a direction opposite to the extending or contracting direction of the one cylinder.

When the vehicle runs on an off-road, an input is often exerted onto the left wheel from a road surface and another input having opposite phase to the input exerted onto the left wheel is often exerted onto the right wheel from the road surface. Thus, at least one of the wheels is easy to be away from the road surface. If the wheel is away from the road surface, the wheel cannot transmit the driving force and braking force to the road surface. In contrast, according to the aspect of the present invention described above, the hydraulic oil can flow through the parallel pipe, and thus, the left and right cylinders can extend and contract in the opposite direction to each other. Therefore, the road-hugging/road-holding property of the wheels is improved.

For example, in a situation where one of the left and right wheels is on the protrusion of the road and the other wheel of the left and right wheels drops in the recess of the road, one of the left and right cylinders contracts to produce a pressure to make the hydraulic oil flow to the parallel pipe, whereby the other of the left and right cylinders extends. Therefore, it is possible to push the other wheel toward the recess of the road to increase the contact force of the other wheel. Accordingly, a running performance of the vehicle on an off-road is improved.

The stabilizer may comprise a turning determination means for determining whether the vehicle is turning or not (S13, S14). The valve controller may be configured to make the parallel on-off valve in the opened state and make the on-off valve for accumulator in the closed state, when the off-road running presumption means presumes that the vehicle is running on an off-road (S17). The valve controller may also be configured to make each of the parallel on-off valve and the on-off valve for accumulator in the closed state (S15), when the off-road running presumption means presumes that the vehicle is not running on an off-road and the turning determination means determines that the vehicle is turning. The valve controller may additionally be configured to make each of the parallel on-off valve and the on-off valve for accumulator in the opened state when the turning determination means determines that the vehicle is not turning (S16).

According to the aspect of the present invention described above can achieve the excellent running performance of the vehicle when the vehicle is running on an off-road, can maintain the stable posture of the vehicle when the vehicle is turning, and can provide the excellent ride quality/comfort of the vehicle when the vehicle is running straight.

The off-road running presumption means may be configured to presume that the vehicle is running on an off-road based on a fact that a transmission is set in a gear range for off-road running.

According to the aspect of the present invention described above, the off-road running presumption means presumably determines that the vehicle is running on an off-road based on a fact that a transmission is set in the gear range for off-road. Therefore, the off-road running presumption means can easily presume/determine whether the vehicle is running on an off-road or not.

The stabilizer may comprise a speed determining means for determining whether the vehicle speed is lower than a predetermined low-speed determining vehicle speed (S21, S22). The valve controller may be configured to make the parallel on-off valve in an opened state, and make the on-off valve for accumulator in a closed state, when the speed determining means determines that the vehicle speed is lower than the low-speed determining vehicle speed. The flow resistance of the parallel pipe may be designed to be smaller than that of the cross pipe.

In the aspect of the present invention described above, the vehicle speed determining means determines whether the vehicle speed is lower than the predetermined low-speed determining vehicle speed. When a driver drives the vehicle on an off-road, typically the driver drives the vehicle at a low speed. Therefore, the low-speed determining means can determine whether there is a possibility that the vehicle is running on an off-road or not based on the vehicle speed. In this case, the low-speed determining vehicle speed is a threshold to determine whether there is a possibility that the vehicle is running on an off-road or not.

Thus, the aspect described above can prevent the stabilizer from realizing the stabilizing function, and enables the left and right cylinders to extend and contract in an opposite direction to each other, when the vehicle runs on an off-road. Therefore, the road-hugging/road-holding property of the wheels can be improved. As a result, the running performance of the vehicle on an off-road can be improved.

The stabilizer may comprise a turning determination means for determining whether the vehicle is turning or not (S13, S14). The valve controller may be configured to make the parallel on-off valve in the opened state and make the on-off valve for accumulator in the closed state when the speed determining means determines that the vehicle speed is lower than the predetermined low-speed determining vehicle speed; may be configured to make the parallel on-off valve in a closed state and make the on-off valve for accumulator in the closed state when the speed determining means determines that the vehicle speed is not lower than the predetermined low-speed determining vehicle speed and the turning determination means determines that the vehicle is turning (S15); and may be configured to make the parallel on-off valve in the closed state and make the on-off valve for accumulator in an opened state when the turning determination means determining that the vehicle is not turning (S16).

According to the aspect of the present invention described above can achieve the excellent running performance of the vehicle when the vehicle is running on an off-road, can maintain the stable posture of the vehicle when the vehicle is turning, and can provide the excellent ride quality/comfort of the vehicle when the vehicle is running straight.

In the above description, references used in the following descriptions regarding embodiments are added with parentheses to the elements of the present invention, in order to understand the invention. However, those references should not be used to limit the scope of the present invention.

DETAILED DESCRIPTION OF THE PREFERRED EMBODIMENTS

An embodiment of a stabilizer of a vehicle according to the present invention will be described hereinafter with reference to the accompanying drawings. Although the stabilizer of the present embodiment is provided to front wheels of a four-wheel-drive vehicle, the stabilizer may be provided to rear wheels or to both of the front and rear wheels. Namely, the stabilizer can be provided to driving wheels.

Figure 1:
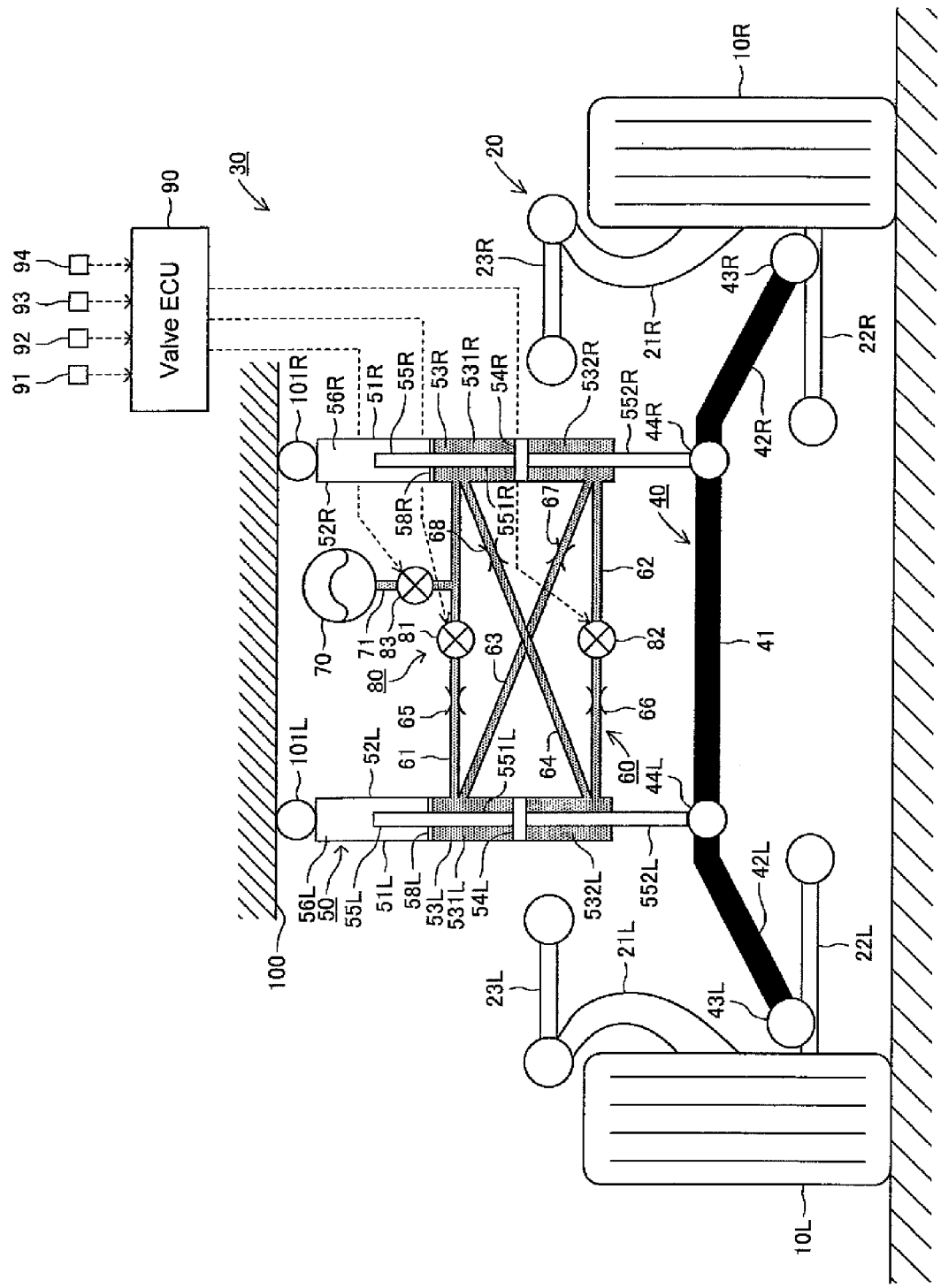
FIG. 1 is a view showing schematic structure of a stabilizer according to an embodiment of the present invention.

As shown in FIG. 1, a left wheel 10L (left side front wheel) and a right wheel 10R (right side front wheel) are connected to a vehicle body via a suspension link 20. The suspension link 20 has left and right knuckles 21L, 21R, left and right lower arms 22L, 22R, and left and right upper arms 23L, 23R. The knuckles 21L and 21R rotatably support the wheels 10L and 10R, respectively. The lower arms 22L, 22R and the upper arms 23L, 23R swingably connect the knuckles 21L, 21R to a vehicle body. A Coil spring (suspension springs) and a shock absorber are provided between each of the lower arms 22L, 22R and the vehicle body (not shown). With respect to the reference letters added to the aforementioned members, a member having "L" positioned at the end of reference letter indicates a member corresponding to the left wheel 10L, and a member having "R" positioned at the end of reference letter indicates a member corresponding to the right wheel 10R.

The stabilizer 30 has a stabilizer bar 40, a cylinder device 50, a pipe section 60, an accumulator 70, a valve device 80, and an electronic control unit for controlling (to open and close) valve 90 (hereinafter it is referred to as a valve ECU 90). The stabilizer bar 40 has a bar shape (a cylindrical shape or a columnar shape). The stabilizer bar 40 is disposed between a suspension member 100 which is a vehicle body member and the wheels 10L, 10R. The stabilizer bar 40 in this embodiment is disposed between the lower arm 22L supporting the left wheel 10L and the lower arm 22R supporting the right wheel 10R so as to connect them.

The stabilizer bar 40 includes a torsion bar portion 41 and left and right arm portions 42L, 42R. The torsion bar portion 41 extends in a vehicle width direction. Both ends of the stabilizer bar 40 are bent to form a substantial L shape. Each portion extending in a front-rear direction of the L shape portion forms the arm portions 42L, 42R respectively (in this embodiment, the arm portions 42L, 42R extend in a front direction (forward) from the torsion bar portion 41). The distal ends of arm portions 42L, 42R are connected to the ends (which are near the wheels 10L, 10R respectively) of the lower arms 22L, 22R via bushes 43L, 43R, respectively. Each of the bushes 43L, 43R is a connection member which has a metal inner cylinder, a metal outer cylinder, and a rubber member disposed between the inner and outer cylinders. For example, the distal ends of the arm portions 42L, 42R are connected to the outer cylinders of the bushes 43L, 43R, and the lower arms 22L, 22R are connected to the inner cylinders of the bushes 43L, 43R.

It is not necessary to form the arm portions 42L, 42R as being parallel to an axis of the vehicle which extends in the front-rear direction. The arm portions 42L, 42R may be formed as being inclined to the axis extending in the front-rear direction in a plane view, a side view, or a front view. It is not necessary to form the arm portions 42L, 42R as being straight members as long as they can produce force to twist the torsion bar portion 41 about its axis.

The torsion bar portion 41 is connected to the cylinder device 50 at the left and right ends thereof. Namely, the torsion bar portion 41 is connected to the cylinder device 50 at two positions having bilateral symmetry each other. The cylinder device 50 comprises a left cylinder 51L and a right cylinder 51R. The left cylinder 51L is connected to a left end portion of torsion bar portion 41 via a bush 44L. The right cylinder 51R is connected to a right end portion of torsion bar portion 41 via a bush 44R. The left cylinder 51L and the right cylinder 51R are disposed so that their axes extend vertically. Upper ends of the left cylinder 51L and the right cylinder 51R are connected to the suspension member 100 via a bush 101L and a bush 101R, respectively. The left cylinder 51L and right cylinders 51R have the same construction as each other. In the figures, members having "L" added to the end of reference letters are members that correspond to the left cylinder 51L, and members having "R" added to the end of reference letters indicate members that correspond to the right cylinder 51R. In the following description, if it is not necessary to distinguish between the left cylinder 51L and the right cylinder 51R, the left cylinder 51L and the right cylinder 51R will be generically referred to as a cylinder 51. Regarding members constituting the left cylinder 51L and members constituting the cylinder 51R, if it is not necessary to distinguish the members provided in the left cylinder 51L from the members provided in the right cylinder 51R, "L" and "R" positioned at the ends of the reference letters will be omitted.

The cylinder 51 includes a cylindrical casing 52, a piston 54, and a piston rod 55. The piston 54 is slidably disposed in an oil room 53 formed in the cylindrical casing 52. The piston rod 55 is fixed to the piston 54 while penetrating the piston 54. The oil room 53 is partitioned into an upper room 531 and a lower room 532 in a fluid-tight manner by the piston 54. A part of the piston rod 55 which extends upward from the piston 54 is referred to as an upper piston rod 551, and another part of the piston rod 55 which extends downward from the piston 54 is referred to as a lower piston rod 552.

The upper room 531L of the left cylinder 51L corresponds to a left side first fluid room of the present invention, and the lower room 532L of the left cylinder 51L corresponds to the left side second fluid room of the present invention. The upper room 531R of the right cylinder 51R corresponds to the right side first fluid room of the present invention, and the lower room 532R of the right cylinder 51R corresponds to the right side second fluid room of the present invention. Hereinafter, the upper room 531L of the left cylinder 51L will be referred to as a left cylinder upper room 531L, and the lower room 532L of the left cylinder 51L will be referred to as a left cylinder side lower room 532L. Similarly, the upper room 531R of the right cylinder 51R will be referred to as a right cylinder upper room 531R, and the lower room 532R of the right cylinder 51R will be referred to as a right cylinder side lower room 532R.

An opened room 56 is formed inside the cylindrical casing 52 using a partition wall 58, and is positioned at an upper side of the oil room 53. The opened room 56 is communicated with (is opened to) the atmosphere (air) outside of the cylindrical casing 52. The upper piston rod 551 extends into (up to) the opened room 56 while penetrating the upper room 531. The opened room 56 is a room where the distal end side of the upper piston rod 551 is movably accommodated. The partition wall 58 partitions the upper room 531 and the opened room 56 such that hydraulic oil does not leak into the opened room 56 from the upper room 531.

Each of the lower piston rods 552 penetrates the lower end of the cylindrical casing 52 (the lower end of the lower room 532) such that its lower end is exposed to the atmosphere. Each of the lower ends of the lower piston rod 552 is connected to the torsion bar portion 41 via bushes 44L, 44R. The bushes 44L and 44R have the same shape as each other. Each of the bushes 44L and 44R has a cylindrical rubber member which supports the outer circumferential surface of the torsion bar portion 41 to connect the torsion bar portion 41 to the lower piston rod 552 so that the torsion bar portion 41 can slidably rotate only in the circumferential direction of the torsion bar portion 41. Thus, the torsion bar portion 41 is rotatable in a circumferential direction about its own axis and cannot move in this axis direction.

The stabilizer bar 40 is supported by the vehicle body via the thus configured cylinder device 50. The cylinder device 50 extends and contracts while making the hydraulic oil flow into and out of the pipe section 60, when the vehicle body and the stabilizer bar 40 move vertically (in a direction of an axis of the cylinder device 50) and relatively to each other.

The pipe section 60 includes an upper parallel pipe 61, a lower parallel pipe 62, an upper left cross pipe 63, and an upper right cross pipe 64. The upper parallel pipe 61 forms a communication passage for communicating the left cylinder upper room 531L and the right cylinder upper room 531R with each other. The lower parallel pipe 62 forms a communication passage for communicating the left cylinder side lower room 532L and the right cylinder side lower room 532R with each other. A structure comprising the upper parallel pipe 61 and the lower parallel pipe 62 corresponds to a parallel pipe of the present invention.

The upper left cross pipe 63 forms a communication passage for communicating the left cylinder upper room 531L and the right cylinder side lower room 532R with each other. The upper right cross pipe 64 forms a communication passage for communicating the right cylinder upper room 531R and the left cylinder side lower room 532L. A structure comprising the upper left cross pipe 63 and the upper right cross pipe 64 corresponds to a cross pipe of the present invention.

An orifice 65 is provided in the upper parallel pipe 61, an orifice 66 is provided in the lower parallel pipe 62, an orifice 67 is provided in the upper left cross pipe 63, and an orifice 68 is provided in the upper right cross pipe 64. Each of the orifices 65, 66, 67, 68 reduces flow rate (reduces a channel sectional area) of the respective pipe. A solenoid valve 81 (hereinafter it will be referred to as an upper on-off valve 81) is provided in the upper parallel pipe 61. A solenoid valve 82 (hereinafter it will be referred to as a lower on-off valve 82) is provided in the lower parallel pipe 62. A structure comprising the upper on-off valve 81 and the lower on-off valve 82 corresponds to a parallel on-off valve of the present invention.

In the present embodiment, the upper parallel pipe 61 and the lower parallel pipe 62 are formed by pipes which have the same internal diameter as each other. Further, the orifices 65, 66 provided in the upper parallel pipe 61 and the lower parallel pipe 62 respectively have the same internal diameter as each other. The upper left cross pipe 63 and the upper right cross pipe 64 are formed by pipes which have the same internal diameter as each other. Furthermore, the orifices 67, 68 provided in the upper left cross pipe 63 and the upper right cross pipe 64 respectively have the same internal diameter as each other.

Each of a flow resistance of the upper parallel pipe 61 and a flow resistance of the lower parallel pipe 62 is designed to be smaller than each of a flow resistance of the upper left cross pipe 63 and a flow resistance of the upper right cross pipe 64. Specifically, the internal diameters of the orifices 65, 66 provided in the upper parallel pipe 61 and the lower parallel pipe 62 respectively are larger than those of the orifices 67, 68 provided in the upper left cross pipe 63 and the upper right cross pipe 64 respectively. Alternatively, when no orifice 65-68 is provided, the internal diameters of the upper parallel pipe 61 and the lower parallel pipe 62 may be larger than those of the upper left cross pipe 63 and the upper right cross pipe 64. By those configurations, a larger amount of the hydraulic oil can flow through the upper parallel the pipe 61 and the lower parallel pipe 62 than the upper left cross pipe 63 and the upper right cross pipe 64.

The upper parallel pipe 61 is connected to the accumulator 70. The accumulator 70 is a closed room for absorbing pressure variation/fluctuation of the hydraulic oil, and gas is charged in the accumulator 70. The accumulator 70 is connected to the upper parallel pipe 61 via the accumulator pipe 71. A solenoid valve 83 (hereinafter it will be referred to as an on-off valve for accumulator 83) is provided on the accumulator pipe 71.

The valve device 80 comprises the upper on-off valve 81, the lower on-off valve 82, and the on-off valve for accumulator 83. Each of the on-off valves 81, 82, and 83 is controlled to be selectively switched between into an open valve state and into a closed state by a drive signal supplied from the valve ECU 90.

The valve ECU 90 controls the opening/closing state of the three on-off valves 81, 82, and 83, provided in the valve device 80. The valve ECU 90 includes a microcomputer and a valve driver circuit as a main part. A vehicle speed sensor 91, a lateral acceleration sensor 92, a steering angle sensor 93, and a gear range sensor 94 are connected to the valve ECU 90. The vehicle speed sensor 91 outputs a detection signal indicating vehicle speed V. The lateral acceleration sensor 92 outputs a detection signal indicating lateral acceleration G which is lateral acceleration of the vehicle body. The steering angle sensor 93 outputs a detection signal indicating a steering angle θ which is a rotation angle of a steering wheel. The gear range sensor 94 outputs a detection signal indicating transfer gear range of a transfer device. A driver sets the gear transfer range by operating a selector (a lever and a switch, etc.). Signs (plus or minus) of each of the detection values of the sensors indicating the lateral acceleration G and the steering angle θ indicate either one of left direction and right direction.

The vehicle of the present embodiment is a four-wheel drive vehicle designed to be able to run on an unpaved road (off-road), in particular on a scree on which a lot of rocks are scattered. In the vehicle, the transfer gear range of the transfer device (gear range of a sub transmission), which can be set by the selector, is switchable between a high range suitable for a four-wheel drive high-speed mode (hereinafter it will be referred to as an H4 range) and low range suitable for a four-wheel drive low-speed mode (hereinafter it will be referred to as an L4 range). In the H4 range, a reduction ratio (input shaft rotation speed/output shaft rotational speed) is set to be low. The H4 range is suitable for a normal running (on-road running) on a general road, an expressway, and the like. In the L4 range, the reduction ratio is set to be high so as to realize a high torque. The Le range is suitable for a running on the off-road. In a state where the transfer gear range of the transfer device is set at one of the H4 range and the L4 range, the gear range can be switched into one of a plurality of gear ranges by a main transmission. For example, in the H4 range for the normal running, the gear range can be switched over among a first gear stage, a second gear stage, a third gear stage, a fourth gear stage, and a fifth gear stage, with respect to the H4 range. In the L4-range for the off-road running, the gear range further can be switched over among a first gear stage, a second gear stage, a third gear stage, a fourth gear stage, and a fifth gear stage, with respect to the L4 range Therefore, when the L4 range is set using the selector, it is possible to assume that the vehicle is running on the off-road.

The valve ECU 90 switches/changes the opening/closing state of valve device 80 (the three on-off valves 81, 82, and 83) so that the stabilizer bar 40 can perform a suitable stabilizing function (can produce returning reaction force) for a running state, or the stabilizer bar 40 can perform a stabilizing function which the driver selects. Processes carried out by the valve ECU 90 will be described hereinafter.

Figure 2:
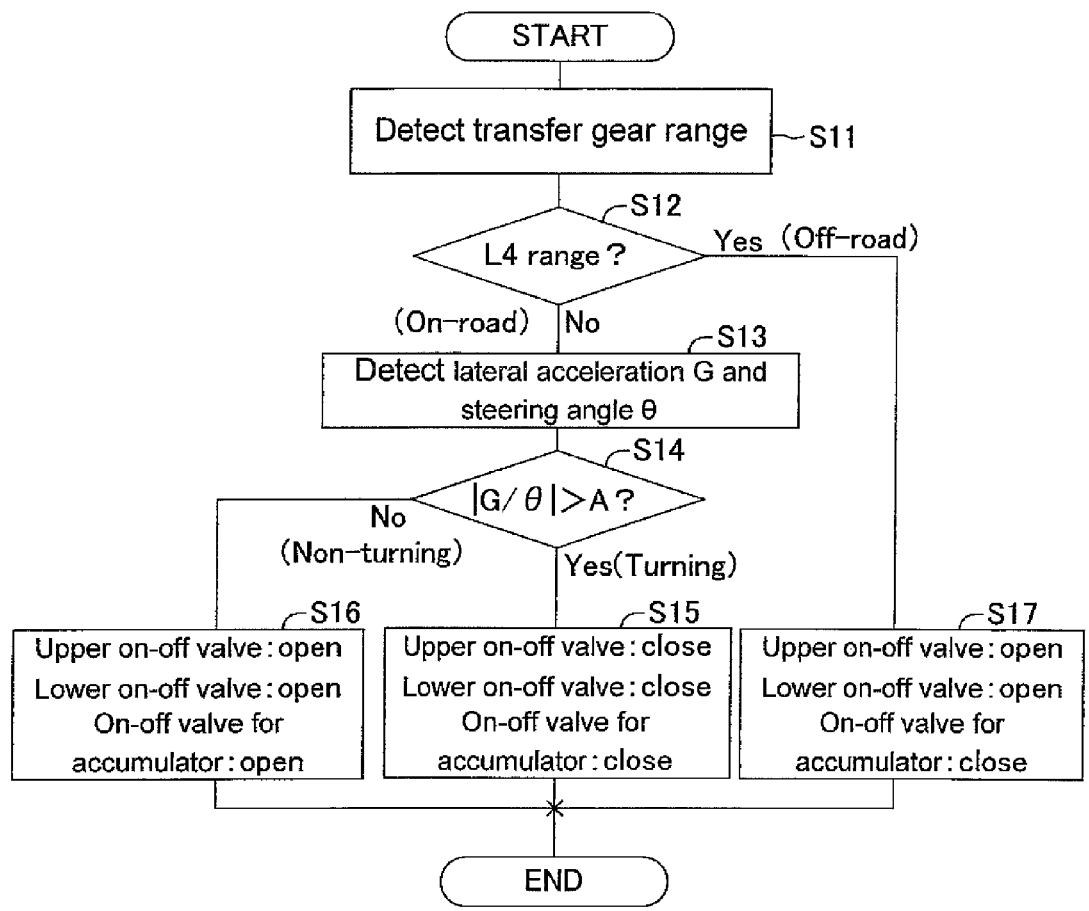
FIG. 2 is a view showing a flowchart of control routine to open and close valves.

FIG. 2 shows a flowchart of a control routine carried out by the valve ECU 90 to open and close valves. While an ignition switch is ON, the valve ECU 90 repeatedly carries out the processes of the control routine to open and close valves at every predetermined operation period.

When the control routine is started, at step S11 the valve ECU 90 reads a gear range of the transfer device detected by the gear range sensor 94. Subsequently, at step S12, the valve ECU 90 determines whether the gear range of the transfer device is the L4 range or not. When a driver drives the vehicle on the off-road (unpaved road), typically the driver sets the gear range of the transfer device to the L4 range. Therefore, the determination at step S12 corresponds to a process to determine whether the vehicle is running on the off-road or not based on a setting state of the gear range of the transfer device.

When the gear range of the transfer device is not the L4 range, in other words, when it is assumed that the vehicle is not running on the off-road, the valve ECU 90 proceeds to step S13.

At step S13, the valve ECU 90 reads the lateral acceleration G of the vehicle body detected by the lateral acceleration sensor 92 and the steering angle θ detected by the steering angle sensor 93. Subsequently, at step S14, the valve ECU 90 determines whether an amplitude (|G/θ|) of a value which is calculated by dividing the lateral acceleration G by the steering angle θ is larger than a determination threshold A. When the value (|G/θ|) is larger than the determination threshold A, the valve ECU 90 determines that the vehicle is turning. When the value (|G/θ|) is less than the determination threshold A, the valve ECU 90 determines that the vehicle is not turning. In the present embodiment, the value (|G/θ|) is set as an index for determining whether the vehicle is in a turning state or not (whether the vehicle is turning or not). Accordingly, the valve ECU 90 determines whether the vehicle is in a turning state or not (performs the turning determination) based on the (|G/θ|). In this case, "turning state" means a turning state where it is assumed that the stabilizer bar 40 should produce the stabilizing function using the torsional reaction force thereof.

Although the above turning determination is based on the value (|G/θ|) which is calculated by dividing the lateral acceleration G by the steering angle θ, this determination is not limited to this. For example, it is possible to carry out the turning determination based on a steering speed. In this case, at step S13, the valve ECU 90 reads the steering angle θ detected by the steering angle sensor 93, and calculates a steering angular velocity ω by differentiating the steering angle θ with respect to time. Then, at step S14, the valve ECU 90 determines whether an amplitude |ω| of the steering angular velocity ω is larger than a determination threshold B. When the steering angular velocity |ω| is larger than the determination threshold B, the valve ECU 90 determines that the vehicle is turning. When the steering angular velocity |ω| is less than the determination threshold B, the valve ECU 90 determines that the vehicle is not turning. In other words, the valve ECU 90 carries out the turning determination based on the steering angular velocity |ω|.

Furthermore, for example, a yaw rate sensor may be provided for detecting yaw rate of the vehicle body. In this case, when an amplitude |γ| of the yaw rate γ is larger than a determination threshold C, the valve ECU 90 may determine that the vehicle is turning.

When the valve ECU 90 determines that the vehicle is turning (step S14: Yes), at step S15 the valve ECU 90 makes the upper on-off valve 81, the lower on-off valve 82, and the on-off valve for accumulator 83 in the closed state, and the valve ECU 90 tentatively ends the control routine to open and close valves. The valve ECU 90 repeatedly carries out the processes of the control routine to open and close valves at every predetermined operation period. Therefore, when the valve ECU 90 determines the vehicle is turning on the on-road, the upper on-off valve 81, the lower on-off valve 82, and the on-off valve for accumulator 83 are maintained in the closed state.

Figure 3:
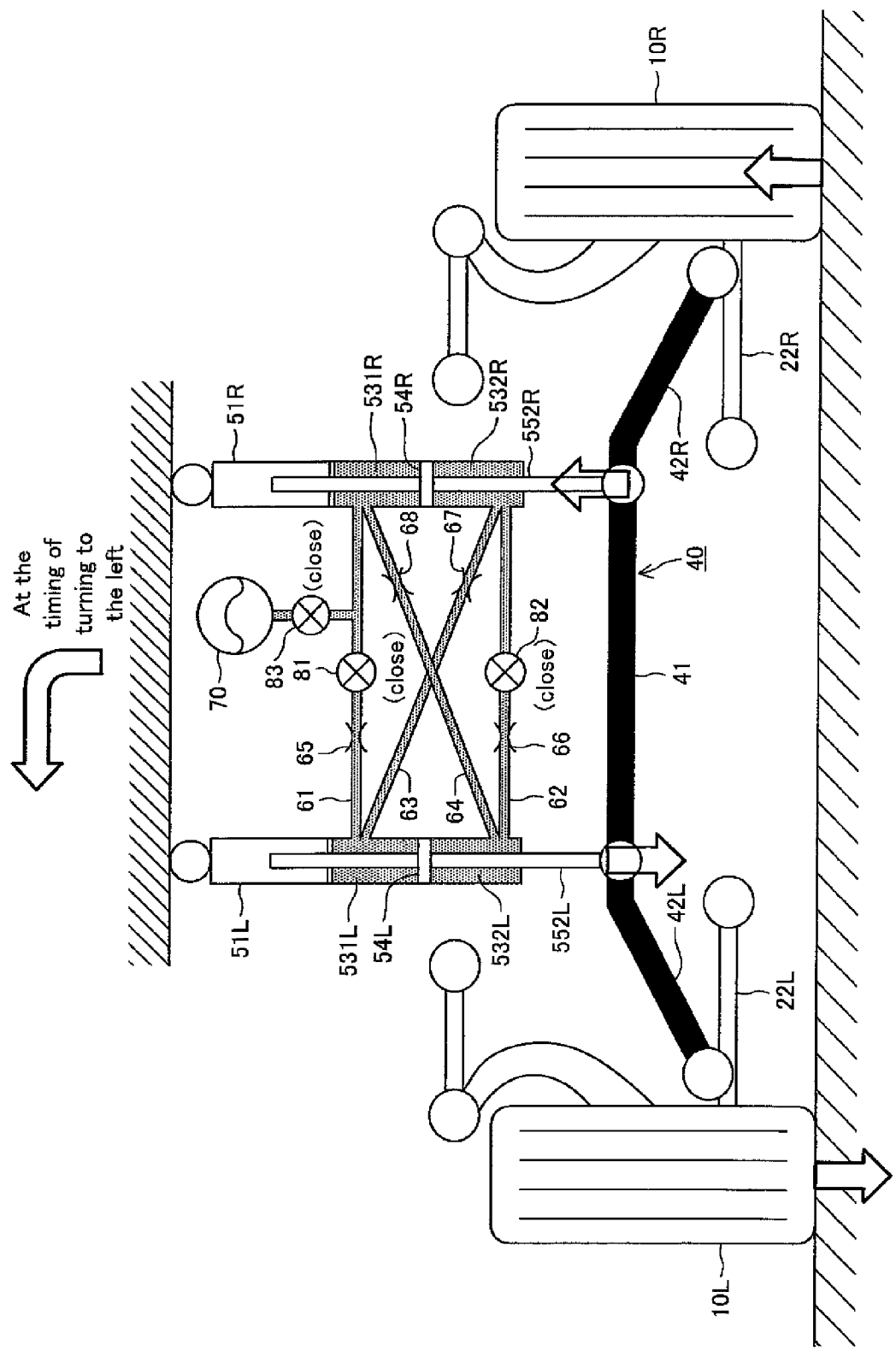
FIG. 3 is a view for explaining an action of the stabilizer when a vehicle turns to the left.

FIG. 3 shows a state of the stabilizer 30 when the vehicle turns to the left. When the vehicle is turning, the upper on-off valve 81, the lower on-off valve 82, and the on-off valve for accumulator 83 are maintained in the closed state. Therefore, a communication between the left cylinder upper room the 531L and the right cylinder upper room 531R is cut off, and a communication between the left cylinder side lower room 532L and the right cylinder side lower room 532R is cut off. Additionally, the left cylinder upper room 531L and the right cylinder upper room 531R become uncommunicated with the accumulator 70.

When the vehicle is turning to the left, a load exerted on the right wheel 10R increases by a lateral acceleration of the vehicle body, while a load exerted on the left wheel 10L decreases. This load change is transmitted to the stabilizer bar 40. Due to the increase in the load exerted on the right wheel 10R, a pressure in the right cylinder upper room 531R rises. On the other hand, due to the decrease in the load exerted on the left wheel 10L, a pressure in the left cylinder side lower room 532L rises. The pressure in the right cylinder upper room 531R and the pressure in the left cylinder side lower room 532L become balanced (become the same pressure as each other), because the right cylinder upper room 531R and the left cylinder side lower room 532L are communicated with each other via the upper right cross pipe 64. As a result, the left cylinder 51L and the right cylinder 51R become a state where they neither extend nor contract. Therefore, the torsion bar portion 41 of the stabilizer bar 40 is twisted by a roll moment that occurs in the vehicle body, whereby the torsion bar portion 41 generates the torsional reaction force in a direction to suppress the roll moment that occurs in the vehicle body. Consequently, a good stabilizing function can be obtained, and it becomes possible to reduce a roll angle of the vehicle body. This enables the vehicle to turn stably.

In the stabilizer 30, the left and right cylinders 51L, 51R are not fully locked. Therefore, for example, in a case where a vertical load change occurs in the wheel 10 temporarily due to protrusions of the road or recesses of the road while the vehicle turning, the pressure between the left and right cylinders 51L, 51R becomes unbalanced, and thus, the hydraulic oil flows through the upper left cross pipe 63 and the upper right cross pipe 64. As a result, the left and right cylinders 51 extend and contract, whereby an input from a road surface can be absorbed by the left and right cylinders 51L, 51R. Therefore, it is possible to absorb/soften an impact transmitted to the vehicle body from the road surface.

The description of the control routine to open and close valves in FIG. 2 will be referred again. When determining that the vehicle is not turning (step S14: No), the valve ECU 90, at step S16, makes the upper on-off valve 81, the lower on-off valve 82, and the on-off valve for accumulator 83 in the opened state, to tentatively end the control routine to open and close valves. The valve ECU 90 repeatedly carries out the processes of the control routine to open and close valves at every predetermined operation period. Therefore, when the valve ECU 90 determines that the vehicle is running on the on-road and is not turning, the upper on-off valve 81, the lower on-off valve 82, and the on-off valve for accumulator 83 are maintained in the opened state.

Figure 4:
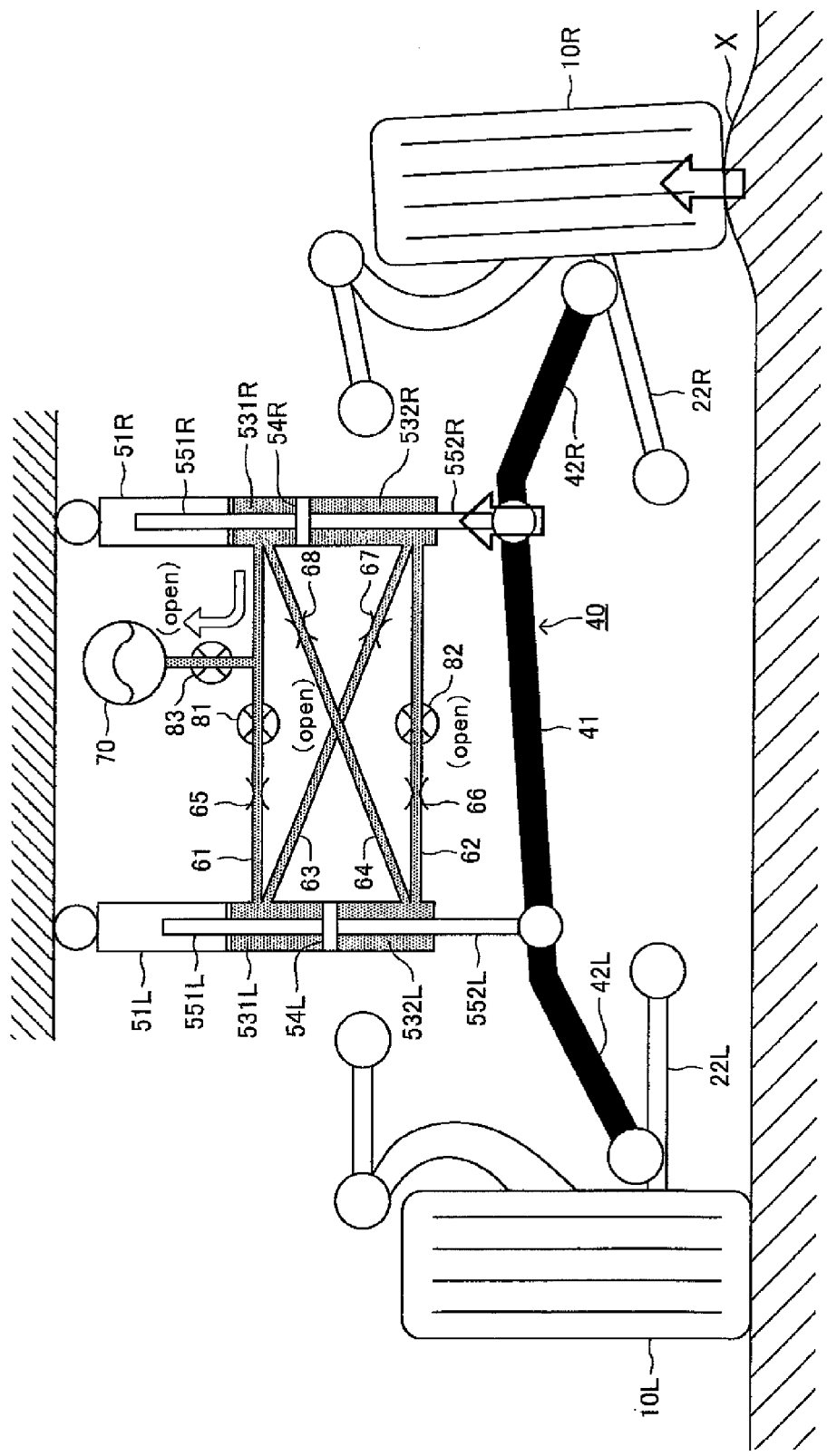
FIG. 4 is a view for explaining an action of the stabilizer when the vehicle runs straight.

FIG. 4 shows a state of the stabilizer 30 when the vehicle is running straight. This figure shows a situation where the right wheel 10R is on the protrusion X of the road. When the vehicle runs straight, the upper on-off valve 81, the lower on-off valve 82, and the on-off valve for accumulator 83 are maintained in the opened state. Therefore, the left cylinder upper room 531L and the right cylinder upper room 531R are communicated with each other, and the left cylinder side lower room 532L and the right cylinder side lower room 532R are communicated with each other. Additionally, the left cylinder upper room 531L and the right cylinder upper room 531R are communicated with the accumulator 70. It should be noted that a communicating state between the left cylinder upper room 531L and the right cylinder side lower room 532R as well as a communicating state between the left cylinder side lower room 532L and the right cylinder upper room 531R are constantly maintained by the two cross pipes 63, 64.

Therefore, when the vehicle is running straight, the hydraulic oil can flow between the left cylinder 51L and the right cylinder 51R freely, and can flow in and out of the accumulator 70. Therefore, the left and right cylinders 51L, 51R can freely extend and contract by a load received from the stabilizer bar 40. For example, as shown in the FIG. 4, when the right wheel 10R is on the protrusion X of the road, the lower arm 22R provided to the right wheel 10R pushes up the arm portion 42R of the stabilizer bar 40. As a result, at the right side portion of the torsion bar portion 41 of the stabilizer bar 40, force that pushes up the lower piston rod 552R of the right cylinder 51R generates. Because the right cylinder upper room 531R is communicated with the accumulator 70, the hydraulic oil in the right cylinder upper room 531R flows into the accumulator 70 due to the push-up force. As a result, the right cylinder 51R is shortened/contracts. When the right wheel 10R overcomes/passes through/climbs over the protrusion X of the road, the lower arm 22R of the right wheel 10R pulls down the stabilizer bar 40 so that the hydraulic oil flows out from the accumulator 70 into the right cylinder upper room 531R.

In this way, since the right and left cylinders 51L, 51R extend and contract by the input from the road surface, the torsion bar portion 41 of the stabilizer bar 40 becomes difficult to be twisted, and therefore, does not perform the stabilizing function.

In general, a stabilizer bar is provided for the purpose of reducing roll angle when the vehicle turns, it may deteriorate the ride quality of the vehicle when the vehicle runs straight. For example, a stabilizer bar may be twisted by temporary input from a road surface. In this case, the vehicle body slowly oscillate in a roll direction by elasticity of the stabilizer bar. In contrast, in the present embodiment, since the left and right cylinders 51L, 51R can extend and contract when the vehicle runs straight, the stabilizer becomes incapable of performing the stabilizing function. Therefore, the vehicle becomes difficult to oscillate in the roll direction, and the ride quality of the vehicle is improved.

Further, since the accumulator 70 is communicated with the left and right cylinders 51L, 51R, it is possible to absorb a volume change (thermal expansion and thermal contraction) of the hydraulic oil.

Additionally, each of the flow resistance of the upper parallel pipe 61 and the flow resistance of lower parallel pipe 62 is designed to be smaller than each of the flow resistance of the upper left cross pipe 63 and the flow resistance of the upper right cross pipe 64. For this reason, when an input is exerted on the left wheel 10L from a road surface and another input having opposite phase to the input exerted on the left wheel 10L is exerted on the right wheel 10R from the road surface, in other words, when the input from the road surface which increases a load exerted on/to one of the left and right wheels 10L, 10R and decreases a load exerted on/to the other of the left and the right wheels 10L, 10R, the hydraulic oil can flow between the cylinder 51L and the right cylinder 51R via parallel pipes 61,62. As a result, the left and right cylinders 51 can extend and contract, whereby impact transmitted to the vehicle body from the road surface can be absorbed/softened. Therefore, the ride quality of the vehicle is improved.

The description of the control routine to open and close valves in FIG. 2 will be referred again. When determining that the gear range of the transfer device is the L4 range at step S12, the valve ECU 90 assumes that the vehicle is running on an off-road to proceed to step S17. At step S17, the valve ECU 90 makes the upper on-off valve 81 and the lower on-off valve 82 in the opened state, and makes the on-off valve for accumulator 83 in the closed state. Thereafter, the valve ECU 90 tentatively ends the control routine to open and close valves. The valve ECU 90 repeatedly carries out the processes of the control routine to open and close valves at every predetermined operation period. Therefore, when the valve ECU 90 determines the vehicle is running on the off-road, the upper on-off valve 81 and the lower on-off valve 82 are maintained in the opened state, and the on-off valve for accumulator 83 is maintained in the closed state. Additionally, the communicating state between the left cylinder upper room 531L and the right cylinder side lower room 532R as well as the communicating state between the left cylinder side lower room 532L and the right cylinder upper room 531R are constantly maintained by the two cross pipes 63, 64.

Figure 5:
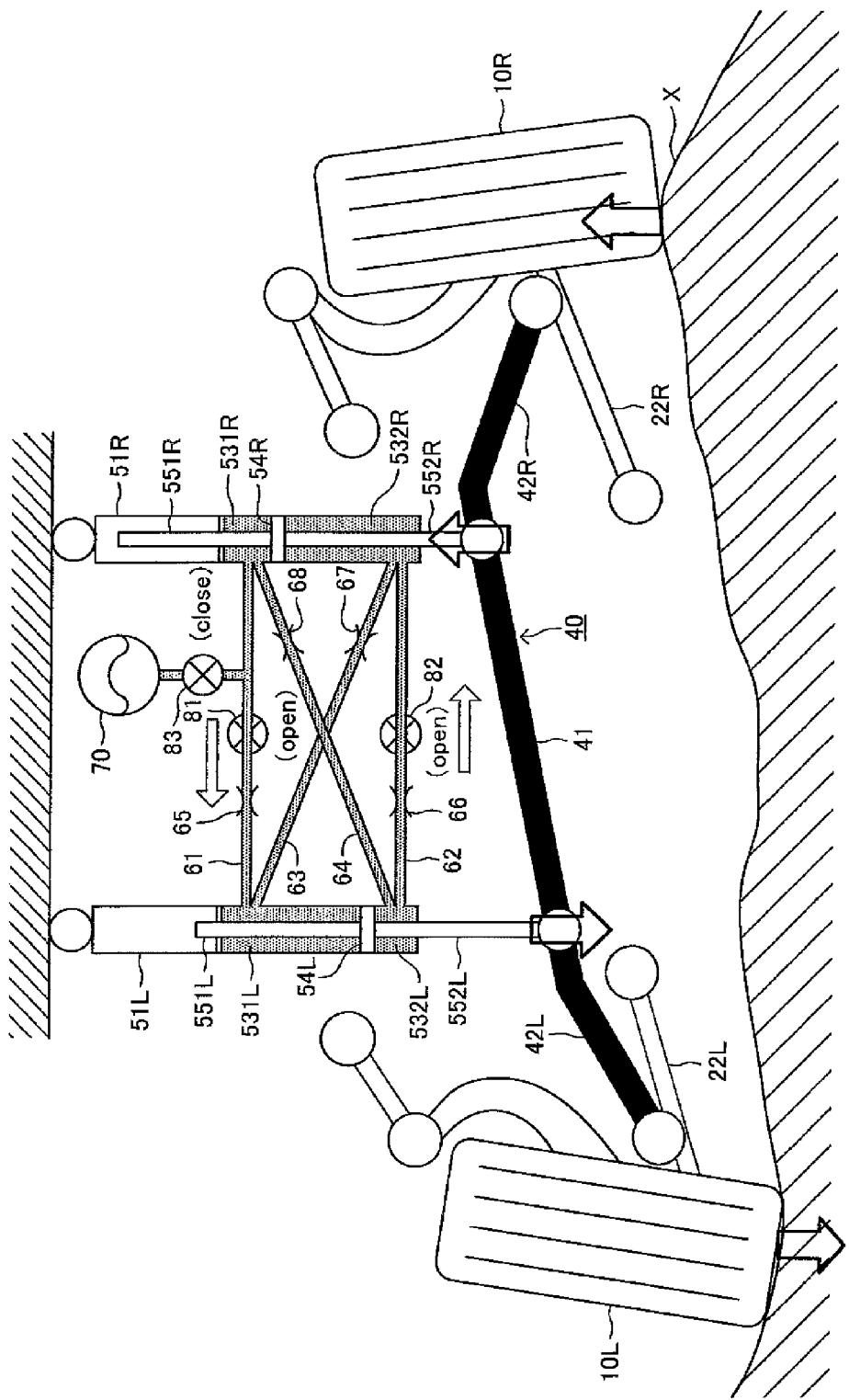
FIG. 5 is a view for explaining an action of the stabilizer when the vehicle runs on an off road.

FIG. 5 shows a state of the stabilizer 30 when the vehicle is running on an off-road. This figure shows a situation where the left wheel 10L drops in a recess Y of a road while the right wheel 10R is on the protrusion X of the road, while the vehicle is slowly running on the scree (road having a lot of rubble). Therefore, input is exerted on/to the left wheel 10L from a road surface and another input having opposite phase to the input exerted on/to the left wheel 10L is exerted on/to the right wheel 10R from the road surface. When the vehicle runs on the off-road, the left cylinder upper room 531L and the right cylinder upper room 531R are communicated with each other, and the left cylinder side lower room 532L and the right cylinder side lower room 532R are communicated with each other. On the other hand, the left cylinder upper room 531L and the right cylinder upper room 531R become uncommunicated with the accumulator 70.

As shown in FIG. 5, at the right wheel 10R side portion of the stabilizer 30, when the right wheel 10R is on the protrusion X of the road, the lower arm 22R of the right wheel 10R pushes up the arm portion 42R of the stabilizer bar 40. As a result, at the right side portion of the torsion bar portion 41 of the stabilizer bar 40, a force that pushes up the lower piston rod 552R of the right cylinder 51R generates, and the pressure of the hydraulic oil in the right cylinder upper room 531R increases. Since the right cylinder upper room 531R and the left cylinder upper room 531L are communicated with each other, the hydraulic oil in the right cylinder upper room 531R flows into the left cylinder upper room 531L via the upper parallel pipe 61 so that the oil pushes down the piston 54L of cylinder 51L.

The left wheel 10R moves downward toward the recess Y of the road. At this time, since the piston 54L of the left cylinder 51L is pushed downward by the pressure of the hydraulic oil supplied from the right cylinder upper room 531R, the lower piston rod 552L of the left cylinder 51L pushes down the left side portion of the torsion bar portion 41 of the stabilizer bar 40. This force works to push the left wheel 10R to the recesses Y of the road. In this time, the hydraulic oil in the left cylinder side lower room 532L flows into the right cylinder side lower room 532R via the lower parallel pipe 62. Therefore, the left and right cylinders 51L, 51R expand and contract in opposite directions to each other. It should be noted that, although the hydraulic oil flows through the upper left cross pipe 63 and the upper right cross pipe 64, the hydraulic oil mainly flows through the upper parallel pipe 61 and lower parallel pipe 62 since the flow resistance of the upper left cross pipe 63 and the flow resistance of the upper right cross pipe 64 is larger than that of the upper parallel pipe 61 and that of the lower parallel pipe 62. Therefore, the left and right cylinders 51L, 51R expand and contract in opposite direction to each other without being interfered by the hydraulic oil in the upper left cross pipe 63 and the upper right cross pipe 64.

Consequently, when the input is exerted onto the left wheel 10L from a road surface and another input having opposite phase to the input exerted onto the left wheel 10L is exerted onto the right wheel 10R from the road surface, the left and right cylinders 51L, 51R become easy to extend and contract, and thus, the torsion bar portion 41 of the stabilizer bar 40 becomes difficult to be twisted so that the stabilizer bar 40 does not perform the stabilizing function. Additionally, because the on-off valve for accumulator 83 is closed, the pressure variation/fluctuation of the hydraulic oil is not absorbed, whereby the hydraulic oil can flow between the left cylinder 51L and the right cylinder 51R by the pressure balance between the left and right cylinders 51L, 51R. Thus, it is possible to transmit the power pushing up the right wheel 10R by the protrusions X of the road to the left wheel 10L so that the power pushes the left wheel 10L toward the recesses Y of the road. Therefore, it is possible to increase a contact force (grounding force) of the left wheel 10L which is dropped in the recesses Y. As a result, a road surface following performance of the left and right wheels 10L, 10R is improved, and thus, a driving force and a braking force of the wheels 10L, 10R can be effectively transmitted to the road surface. Therefore, a running performance of the vehicle on an off-road is improved.

According to the stabilizer 30 of the present embodiment described above, when the vehicle is turning on an on-road, it is possible to suppress the rolling motion of the vehicle because the stabilizer 30 can perform the stabilizing function. Furthermore, when the vehicle is running straight on an on-road, it is possible to improve the ride quality/comfort of the vehicle because the stabilizer 30 does not perform the stabilizing function. Therefore, it is possible to stabilize the vehicle and improve the ride quality/comfort of the vehicle. Furthermore, when the vehicle is running on an off-road, the road surface following performance of the left and right wheels 10L, 10R is improved, and thus, the running performance of the vehicle on an off-road is improved, because the stabilizer 30 does not perform the stabilizing function, and the left and right wheels 10L, 10R can be easy to stroke with opposite phase to each other.

In this manner, according to the stabilizer 30 of the present embodiment, it is possible to automatically switch the stabilizer 30 between in a valid state where the stabilizer 30 can perform the stabilizing function and in an invalid state where the stabilizer 30 cannot perform the stabilizing function, based on (in response to) a running state of the vehicle and an operation by a driver. Additionally, when the L4 range is set by the selector, the valve ECU 90 assumes that the vehicle is running on an off-road. Therefore, the valve ECU 90 can easily determine whether the vehicle is running on an off-road or not.

Figure 6:
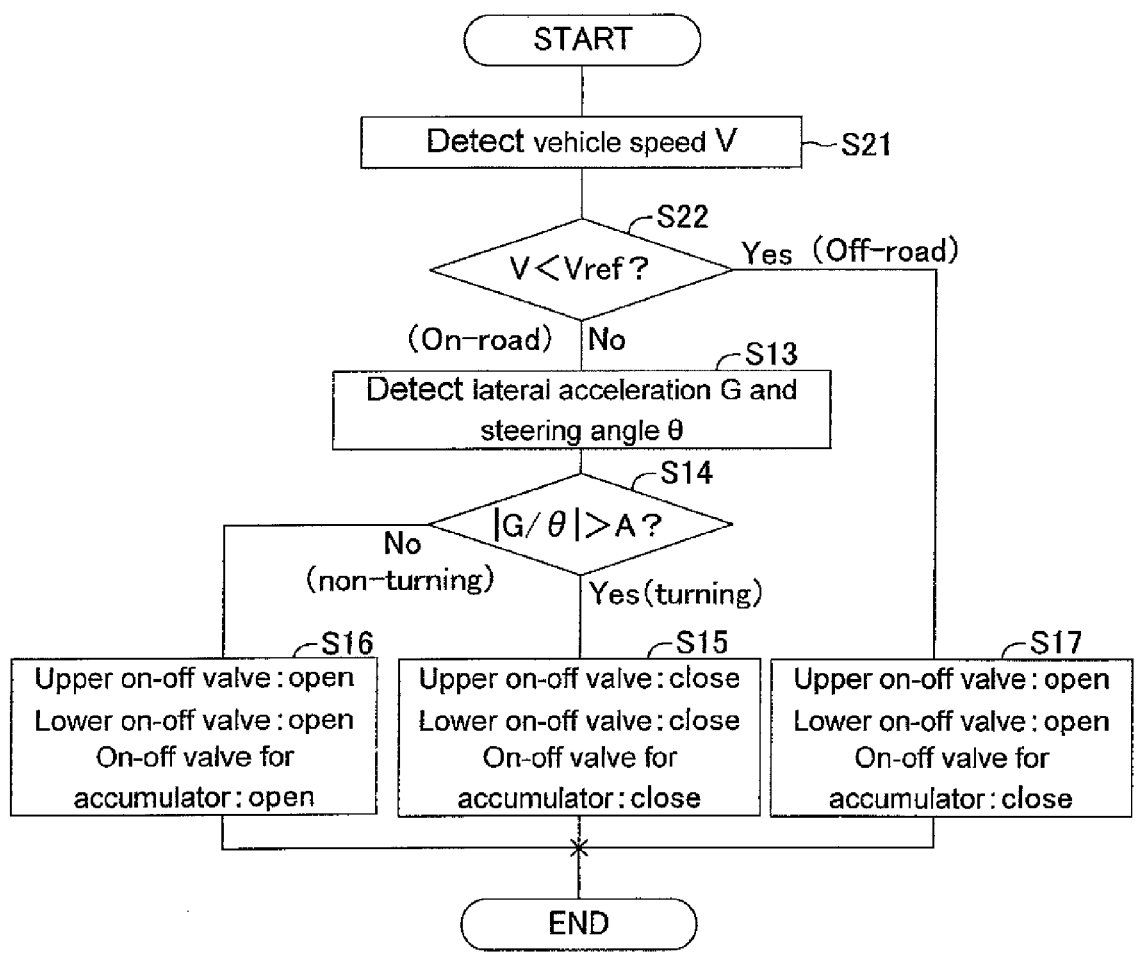
FIG. 6 is a view showing a flowchart of control routine to open and close valves according to a first modified embodiment of the present invention.

First Modified Embodiment: An Example of Switching the Valve Opening/Closing State Based on Vehicle Speed In the above embodiment, at steps S11, S12, the off-road running determination is made. However, instead of that, the valve ECU 90 may be configured to carry out a low-speed running determination. FIG. 6 shows a control routine to open and close valves according to the first modified embodiment. This control routine to open and close valves has processes of steps S21, S22 in place of the steps S11, S12 of the above embodiment. A step number is given to a process which is the same as the process of the above embodiment in the drawings, the step number being the same as the number given to the process of the above embodiment. Hereinafter, description about the same processes as the above embodiment will be omitted.

When the routine is started, the valve ECU 90 reads the vehicle speed V detected by the vehicle speed sensor 91 at step S21, and determines whether the vehicle speed V is less than a low-speed determining vehicle speed Vref at step S22. If the vehicle speed V is less than the low-speed determining vehicle speed Vref, the valve ECU 90 proceeds to step S17. Alternatively, if the vehicle speed V is equal to or higher than the low-speed determining vehicle speed Vref, the valve ECU 90 proceeds to step S13. Therefore, when the vehicle is running at a low speed, the valve ECU 90 proceeds to step S17 to make the upper on-off valve 81 and the lower on-off valve 82 in the opened state and make the on-off valve for accumulator 83 in the closed state.

When the vehicle is running on an off-road, especially a road (scree) on which a lot of rocks are scattered rocks, a driver typically drives the vehicle at a low speed. Therefore, in the first modified embodiment as well, similarly to the above embodiment, the road surface following performance of the left and right wheels 10L, 10R at the time of off-road driving is improved, and the running performance is improved. Additionally, this modified embodiment can be applied to a vehicle which cannot switch the transfer gear range of the transfer device between a gear range for an on-road driving (normal driving) and a gear range for an off-road driving.

Figure 7:
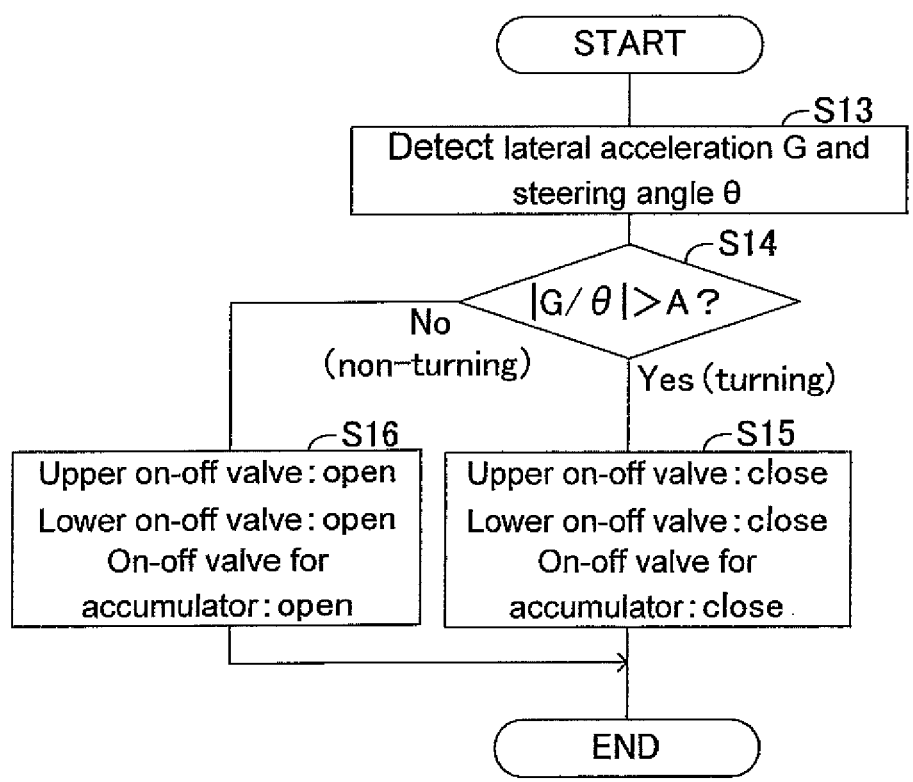
FIG. 7 is a view showing a flowchart of control routine to open and close valves according to a second modified embodiment of the present invention.

Second Modified Embodiment: Valve Opening and Closing Control Depending on Only Whether a Vehicle is Turning or not The above-described embodiment and the first modified embodiment have the configuration to change the state of the valve device 80 to the opening/closing state suitable for the off-road driving after carrying out the off-road running determination or the low-speed running determination. However, such a configuration is not necessarily required. In the second modified embodiment, the vehicle has a configuration to switch/change the opening/closing state of the valve device 80 to one of two states based on only whether the vehicle is turning or not. The valve ECU 90 carries out a control routine to open and close valves shown in FIG. 7. The control routine to open and close valves according to the second modified embodiment is obtained by omitting the steps S11, S12, and S17 of the control routine to open and close valves from the control routine of the above embodiment.

In this second modified embodiment, similarly to the above embodiment, when the vehicle is turning (step S14: Yes), the left cylinder 51L and the right cylinder 51R become the state where they do not extend and contract, and the stabilizer bar 40 generates the torsional reaction force in the direction to suppress the roll moment of the vehicle so that the roll angle of the vehicle is reduced. Meanwhile, when the vehicle is not turning (Step S14: No), the left cylinder 51L and the right cylinder 51R can extend and contract, and thus, the stabilizer bar 40 does not perform the stabilizing function. Therefore, the ride quality/comfort of the vehicle is improved. When input is exerted onto the left wheel 10L from a road surface and another input having opposite phase to the input exerted onto the left wheel 10L is exerted onto the right wheel 10R from the road surface, the left and right cylinders 51 extend and contract, whereby impact transmitted to the vehicle body from the road surface can be softened/absorbed.

Third Modified Embodiment: An Example Having No Accumulator

Figure 8:
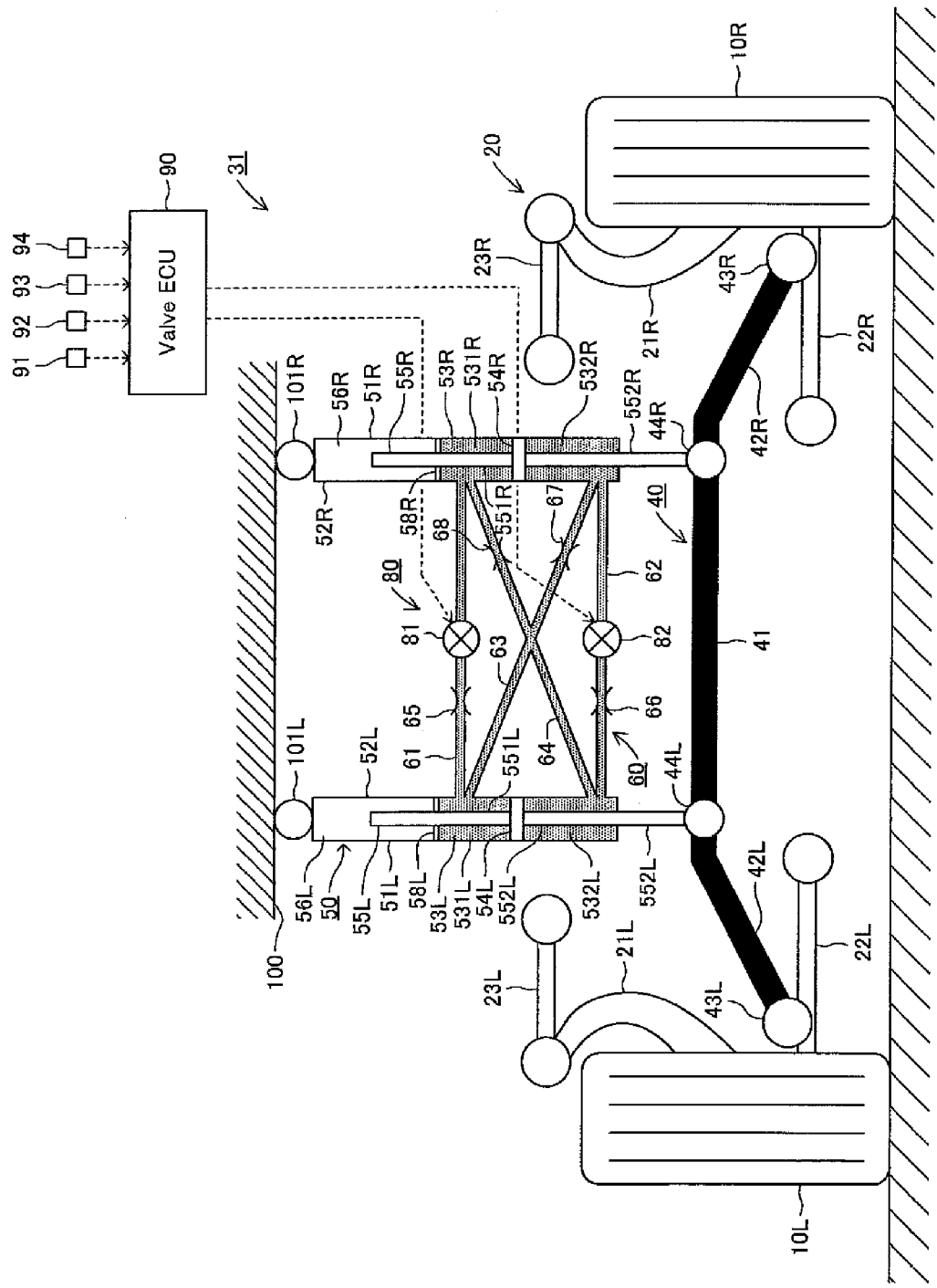
FIG. 8 is a view showing schematic structure of a stabilizer according to a third modified embodiment of the present invention.

The above embodiment and the two modified embodiments have the accumulator 70 and the on-off valve for accumulator 83, and each of them has the configuration to switch/change the opening/closing state of the on-off valve for accumulator 83 based on (in response to) the running state of the vehicle or an operation by a driver (a state of a selector switch). However, such a configuration is not necessarily required. FIG. 8 shows a schematic structure of a stabilizer 31 according to a third modified embodiment. As shown in this figure, the stabilizer 31 according to the third modified embodiment does not have the accumulator 70, the accumulator pipe 71, and the on-off valve for accumulator 83, that are provided in the above embodiment and the first and second modified embodiments.

Figure 9:
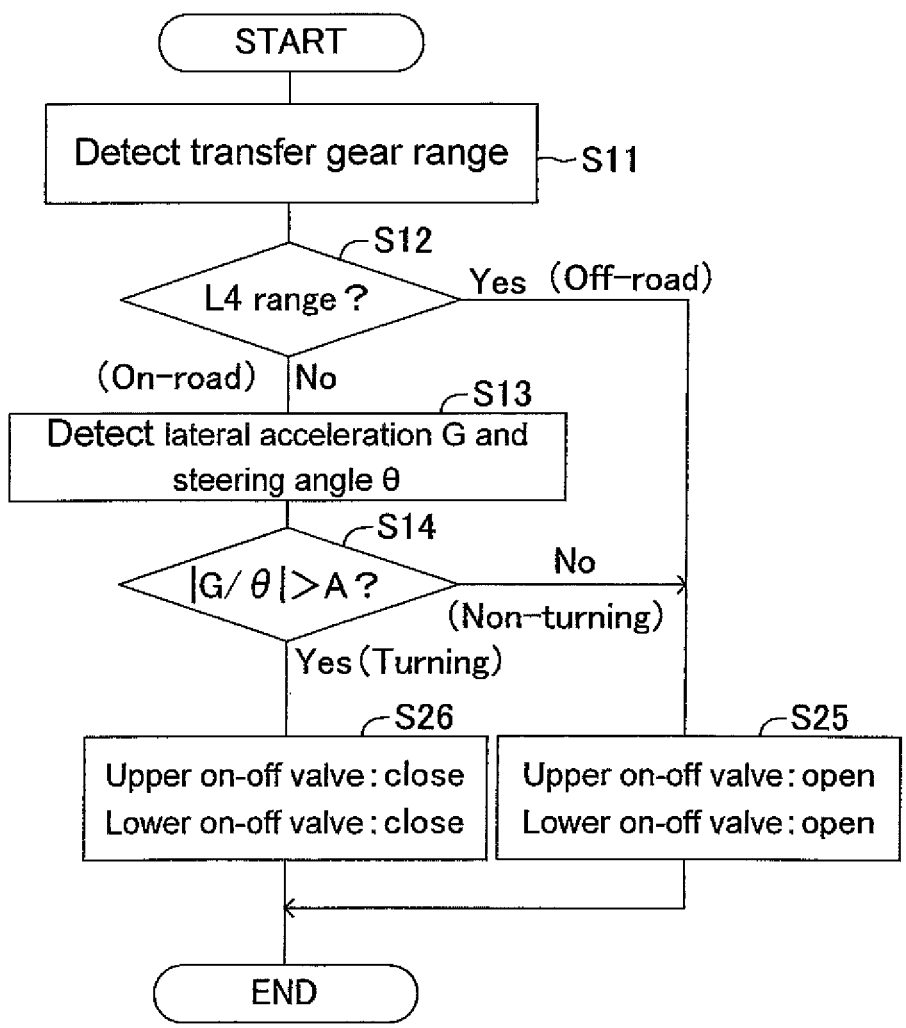
FIG. 9 is a view showing a flowchart of control routine to open and close valves according to the third modified embodiment of the present invention.

In the third modified embodiment, the valve ECU 90 carries out a valve control routine shown in FIG. 9. The valve control routine carried out in the third modified embodiment has processes of steps S25, S26 instead of the steps S15, S16, and S17 of the above embodiment.

When the valve ECU 90 determines that the vehicle is running on an off-road (S12: Yes, or that the vehicle is running at the low speed), the valve ECU 90 makes the upper on-off valve 81 and the lower on-off valve 82 in the opened state at step 25. Therefore, the stabilizer 31 becomes in a state which is substantially the same as the state shown in FIG. 5 of the above embodiment. Thus, as described above, the left and right cylinders 51L, 51R can extended and contract in an opposite direction to each other. As a result, the road surface following performance of the left and right wheels 10L, 10R is improved, and the running performance of the vehicle on an off-road is improved.

Additionally, the valve ECU 90 proceeds to step S25 even when it determines that the vehicle is not turning at step S14. Therefore, the stabilizer 31 is maintained in the same state as the state when the valve ECU 90 determines that the vehicle is running on an off-road, and thus, the stabilizer 31 becomes incapable of performing the stabilizing function. Accordingly, the ride quality/comfort of the vehicle is improved.

Additionally, when the valve ECU 90 determines that the vehicle is turning at step S14, the valve ECU 90 makes the upper on-off valve 81 and the lower on-off valve 82 in the closed state at step S26. Therefore, the communication between the left cylinder upper room 531L and the right cylinder upper room 531R is cut off, and the communication between the left cylinder side lower room 532L and the right cylinder side lower room 532R is also cut off, in the same manner as the above embodiment (and the first and second modified embodiments). Thus, the left and right cylinders 51L, 51R are in a state where they neither extend nor contract (the state being substantially the same as the state shown in FIG. 3 of the above embodiment). Therefore, the torsion bar portion 41 of the stabilizer bar 40 is twisted by the roll moment that occurs in the vehicle body, and thus, the torsion bar portion 41 generates a torsional reaction force in a direction to suppress the roll moment. As a result, good stabilizing function can be obtained to reduce a roll angle of the vehicle body. This enables the vehicle to turn stably.

According to the third modified embodiment, it is possible to carry out the invention with a simple structure having no accumulator and no on-off valve for accumulator. It should be noted that the valve opening and closing control of the first or the second modified embodiment may be applied to the third modified embodiment.

Figure 10:
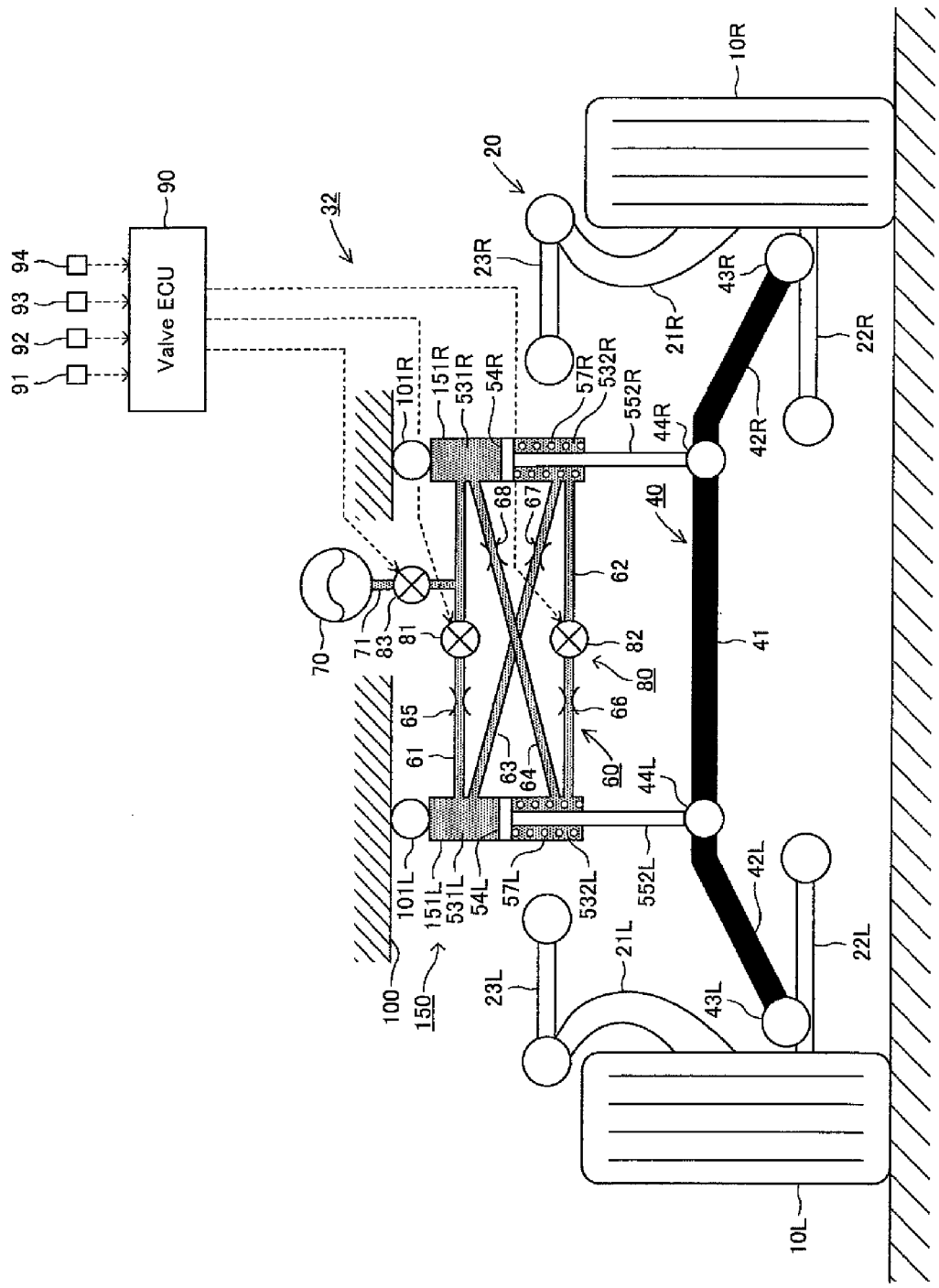
FIG. 10 is a view showing schematic structure of a stabilizer according to a fourth modified embodiment of the present invention.

Fourth Modified Embodiment: A Modified Embodiment of the Structure of the Piston In the above embodiment, the cylinder device 50 has two of the cylinders 51, each of which has the piston rod 55 (the upper piston rod 551 and the lower piston rod 552) projecting from the piston rod 55 in the opposite directions to each other. However, such a type is not necessarily required. FIG. 10 shows a schematic structure of a stabilizer 32 according to a fourth modified embodiment. The stabilizer 32 has a cylinder device 150 in place of the cylinder device 50. The cylinder device 150 includes two cylinders 151L, 151R. Each cylinder 151 has a piston rod 552 (it corresponds to the lower piston rod 552 in the above embodiment) which projects in only one side direction (lower side in this modified embodiment) from the piston 54. This cylinder 151 does not have the opened room 56 of the above embodiment because it has no upper piston rod. It should be noted that the fourth modified embodiment is the same as the above embodiment expect for the cylinder device, and thus, description on the configuration common to the embodiment will be omitted, hereinafter. Further, the control routine to open and close valves carried out by the valve ECU 90 in the above embodiment, first modified embodiment, and the second modified embodiment can be applied to this modified embodiment.

The connection structure between the cylinder device 150 and the pipe section 60 is similar to the structure of the above embodiment. Namely, the left cylinder upper room 531L and the right cylinder upper room 531R are connected by the upper parallel pipe 61, and the left cylinder side lower room 532L and the right cylinder side lower room 532R are connected by the lower parallel pipe 62. Additionally, the left cylinder upper room 531L and the right cylinder side lower room 532R are connected by the upper left cross pipe 63, and the left cylinder side lower room 532L and the right cylinder upper room 531R are connected by the upper left cross pipe 64.

In the cylinder 151, a hydraulic oil pressure receiving area of the upper surface of the piston 54 and that of the lower surface of the piston 54 are different from each other. Therefore, the cylinder 151 has a coil spring 57 in order to balance between a pressure in the upper room 531 and pressure in the lower room 532. The coil spring 57 is provided in the lower room 532. The lower room 532 is a room in which the piston rod 552 is disposed and faces the lower surface (which has the smaller hydraulic oil pressure receiving area than the upper surface) of the piston 54. The coil spring 57 allows a length of the cylinder 151 to be maintained to a predetermined length when the cylinder 151 is in a neutral condition (when the suspension is at a middle position of a stroke of the suspension).

According to the fourth modified embodiment, since it is possible to omit the upper piston rod 551 and the opened room 56, which are provided in the above embodiment, an axial length of the cylinder 151 can be shorter than that of the above embodiment. Therefore, it is possible to achieve a space saving. In this fourth modified embodiment, similarly to the third modified embodiment, the accumulator 70, the accumulator pipe 71, and the on-off valve for accumulator 83 may be omitted. In this case, it is preferable to apply the valve control routine of the third modified embodiment to this modified embodiment.

Figure 11:
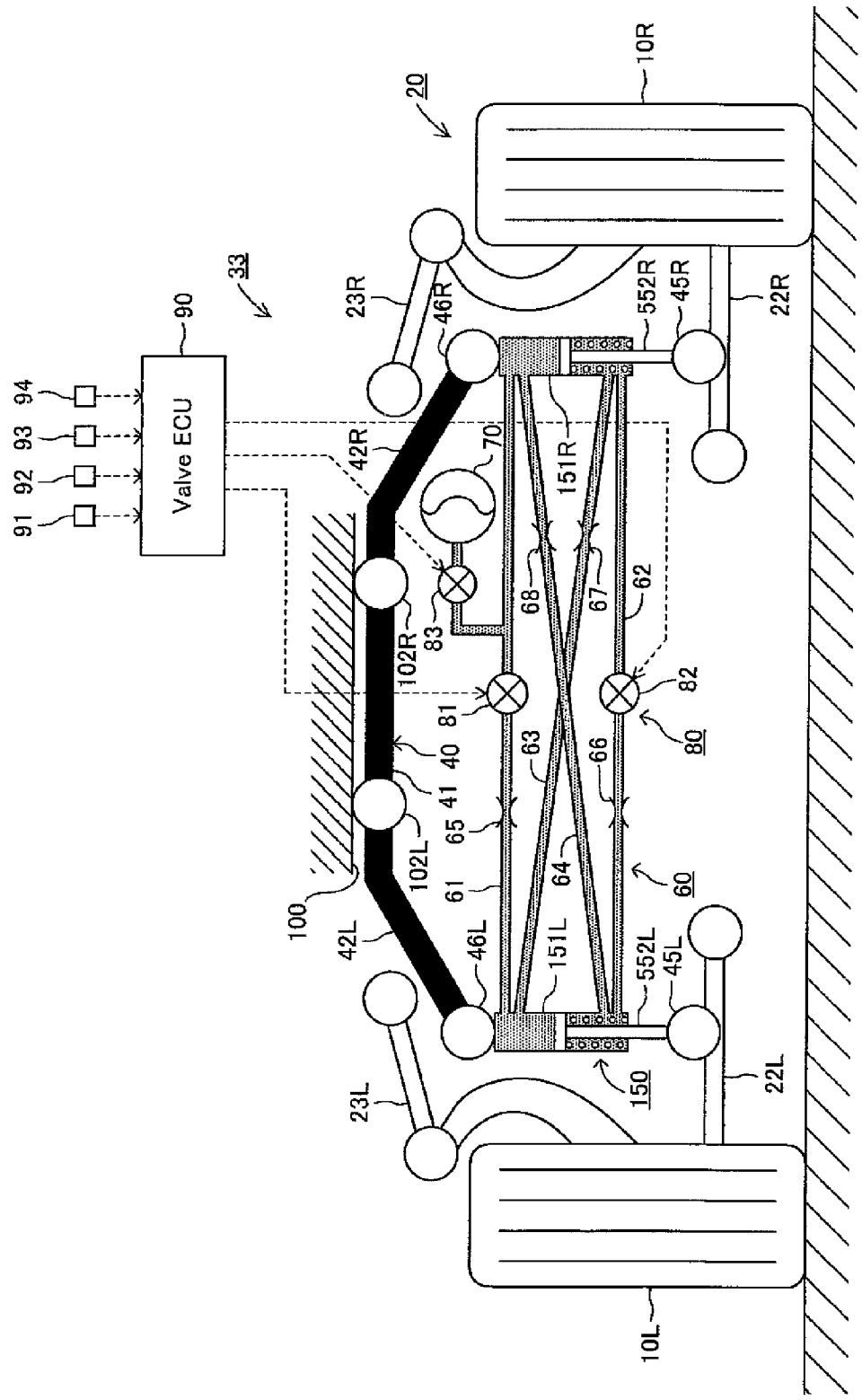
FIG. 11 is a view showing schematic structure of a stabilizer according to a fifth modified embodiment of the present invention.

Fifth Modified Embodiment: A Modified Embodiment of the Cylinder Mounting Position The stabilizer 30 of the above embodiment has the configuration in which the cylinder device 50 is provided between the stabilizer bar 40 and the suspension member 100 which is the vehicle body member. However, it is not necessarily required to provide the cylinder device 50 at that position. FIG. 11 shows a schematic structure of a stabilizer 33 according to a fifth modified embodiment. In the stabilizer 33, the cylinder device 150 (which is the same as the cylinder device 150 described in the fourth modified embodiment) is disposed between the stabilizer bar 40 and the wheels 10L, 10R. In the stabilizer 33 of the fifth modified embodiment, the stabilizer bar 40 is connected to the suspension member 100 via bushes 102L, 102R at the left and right sides of the torsion bar portion 41 so that the stabilizer bar 40 is rotatable about its axis thereof.

The left and right cylinders 151L, 151R are arranged between the distal ends of the arm portions 42L, 42R and the left and right lower arms 22L, 22R, respectively, so that axes of the cylinders 151L, 151R extend vertically. In the cylinders 151L, 151R, distal ends of the piston rods 552L, 552R are connected to the lower arms 22L, 22R via bushes 45L, 45R (or ball joints), respectively, and the upper ends of the cylindrical casings 52L, 52R and distal ends of the arm portions 42L, 42R are connected via bushes 46L, 46R (or ball joints), respectively. When the stabilizer 40 and the wheels 10L, 10R move relatively to each other and vertically (in a direction of an axis of each of the cylinders 151L, 151R), the cylinder device 150 extends and contracts while the hydraulic oil flows in and out of the pipe section 60.

In the stabilizer 33 of the fifth modified embodiment, the cylinder device 150 which is the same as one in the fourth modified embodiment is provided between the wheels 10 and the stabilizer bar 40. However, the cylinder device 50 which is the same as one in the above embodiment may be provided in the stabilizer 33 instead of the cylinder device 150.

In this modified embodiment, the pipe section 60, the accumulator 70, and the valve device 80 which are provided between the left cylinder 151L and the right cylinder 151R may be the same as those used in the above embodiment. Furthermore, the control routine to open and close valves which is carried out by the valve ECU 90 may be the same as one which is adopted by the above embodiment.

According to the fifth modified embodiment, in the same way as the above embodiment, when the vehicle runs on an on-road, a communication between the left cylinder upper room 531L and the right cylinder upper room 531R is cut off, and a communication between the left cylinder side lower room 532L and the right cylinder side lower room 532R is cut off. Additionally, the left cylinder upper room 531L and the right cylinder upper room 531R become uncommunicated with the accumulator 70. Thus, the left cylinder 151L and the right cylinder 151R are in a state where they do not extend and contract. As a result, the torsion bar portion 41 of the stabilizer bar 40 is twisted by a roll moment that occurs in the vehicle body, whereby the torsion bar portion 41 generates a torsional reaction force in a direction to suppress the roll moment that occurs in the vehicle body.

Additionally, when the vehicle runs straight, similarly to the above embodiment, the left cylinder upper room 531L and the right cylinder upper room 531R are communicated with each other, and the left cylinder side lower room 532L and the right cylinder side lower room 532R are communicated with each other. At the same time, the left cylinder upper room 531L and the right cylinder upper room 531R are communicated with the accumulator 70. Thus, cylinders 151L, 151R can freely extend and contract by a load received from the lower arms 22L, 22R. As a result, the torsion bar portion 41 of the stabilizer bar 40 becomes difficult to be twisted, and thus, does not perform the stabilizing function.

Furthermore, when the vehicle runs on an off-road, similarly to the above embodiment, the left cylinder upper room 531L and the right cylinder upper room 531R are communicated with each other, and the left cylinder side lower room 532L and the right cylinder side lower room 532R are communicated with each other. In addition, the left cylinder upper room 531L and the right cylinder upper room 531R become uncommunicated with the accumulator 70. As a result, when an input is exerted onto the left wheel 10L from a road surface and another input having opposite phase to the input exerted onto the left wheel 10L is exerted onto the right wheel 10R from the road surface, the left and right cylinders 151L, 151R extend and contract in an opposite direction to each other. Thus, it is possible to transmit a power pushing up one of the left and right wheels 10L, 10R (for example, the right wheel 10R) caused by the protrusion X of the road to the other of the left and right wheels 10L, 10R (for example, the left wheel 10L) so that the other of the left and right wheels 10L, 10R is pushed toward the recess Y of the road. Therefore, it is possible to increase the contact force (grounding force) of the left wheel 10L which is dropped in the recess Y. As a result, a road surface following performance of the left and right wheels 10L, 10R is improved, and a driving force of the wheels 10L, 10R can be effectively transmitted to the road surface. Therefore, the running performance of the vehicle on an off-road is improved.

The control routine to open and close valves of the first and second modified embodiments may be applied to the fifth modified embodiment. In the fifth modified embodiment, similarly to the third modified embodiment, the accumulator 70, the accumulator pipe 71, and the on-off valve for accumulator 83 may be omitted. In this case, it is preferable to apply the control routine to open and close valves of the third modified embodiment to the fifth modified embodiment.

The stabilizers according to the above embodiment and the modified embodiments have been described. However, the present invention is not limited to the above embodiment and modified embodiments, and various modifications can be made without departing from the object of the present invention.

For example, in the above embodiment, the turning determination is carried out/made based on $|G/\theta|$ which is calculated by dividing the lateral acceleration G by the steering angle $\theta$, or $|\omega|$ which is the magnitude of the steering angular velocity. However, for instance, it is possible to obtain a position of the vehicle on a map using the vehicle position detection device (for example, GPS etc.) to carry out the turning determination based on the position and road information (for example, information about a curve in the road) included in map information.

Additionally, for instance, it is possible to obtain a position of the vehicle on a map using the vehicle position detection device (for example, GPS etc.) and to assume whether the vehicle is running on an off-road or not based on road surface condition information (information to determine whether the road is an off-road or not) at the vehicle position.

Moreover, the vehicle may have a running mode selection switch (not shown). If the vehicle has that switch, a driver can select, as a running mode of the vehicle, one of a normal on-road running mode and an off-road running mode, using the switch. In this case, when processing the control routine to open and close valves, the valve ECU 90 reads a data indicating a selected state of the running mode selection switch at step 11, and the valve ECU 90 determines whether the off-road running mode is selected based on the selected state of the running mode selection switch at step S12. According to this modification, the vehicle can directly perform a stabilizing function the driver requires.

The vehicle may have a stabilizing function selecting switch to simply switch between a valid state of the stabilizing function and an invalid state of the stabilizing function, so that a driver can operate the stabilizing function selecting switch to select one of states. In this case, the valve ECU 90 reads a data indicating a selected state of the stabilizing function selecting switch. If the stabilizing function is set in the valid state, the valve ECU 90 makes the upper on-off valve 81, the lower on-off valve 82, and the on-off valve for accumulator 83 in the closed state. If the stabilizing function is set in the invalid state, the valve ECU 90 makes the upper on-off valve 81, the lower on-off valve 82, and the on-off valve for accumulator 83 in the opened state.

Additionally, the accumulator 70 may be communicated with the lower parallel pipe 62, in addition to or in place of the upper parallel pipe 61. Further, the vehicle may have an accumulator communicated with the upper parallel pipe 61 and another (independent) accumulator communicated with the lower parallel pipe 62. In this case, an on-off valve for accumulator may be provided depending on how the accumulator(s) is provided, and the on-off valve for accumulator(s) may be controlled according to a valve control routine.

In the above embodiment, the distal ends of the stabilizer bar 40 are connected to the lower arms 22. However, the members to which the distal ends of the stabilizer bar 40 are connected are not limited to them. Namely, an unsprung mass member moving upward and downward together with the wheels 10 may be the member to which the distal ends of the stabilizer bar 40 are connected. Additionally, in the fifth embodiment, members to which the lower ends of the cylinders 151 are connected may be the unsprung mass members moving upward and downward together with the wheels 10 instead of the lower arms 22.

In the present embodiment, the cylinder device 50 is connected to the torsion bar portion 41 of the stabilizer bar 40. However, for example, the cylinder device 50 may be connected to the arm portions 42L, 42R.

What is claimed is:

1. A stabilizer comprising:
   a stabilizer bar provided between left-and-right wheels and a vehicle body; and
   a cylinder device including a left cylinder and a right cylinder,
   wherein said left cylinder and said right cylinder are disposed between said stabilizer bar and said vehicle body, at a left side and a right side in a vehicle width direction, respectively, and extend and contract when said stabilizer bar and said vehicle body vertically move relatively to each other, or
   said left cylinder is disposed between said stabilizer bar and said left wheel to extend and contract when said stabilizer bar and said left wheel vertically move relatively to each other, and said right cylinder is disposed between said stabilizer bar and said right wheel to extend and contract when said stabilizer bar and said right wheel vertically move relatively to each other;
   wherein,
   said left cylinder includes a left side first fluid room and a left side second fluid room which are partitioned by a left piston, wherein said left side first fluid room is compressed by said left piston upon said left cylinder contracting, and said left side first fluid room is expanded by said left piston upon said left cylinder extending, and wherein said left side second fluid room is compressed by said left piston upon said left cylinder extending, and said left side second fluid room is expanded by said left piston upon said left cylinder contracting; and
   said right cylinder includes a right side first fluid room and a right side second fluid room which are partitioned by a right piston, wherein said right side first fluid room is compressed by said right piston upon said right cylinder contracting, and said right side first fluid room is expanded by said right piston upon said right cylinder extending, and wherein said right side second fluid room is compressed by said right piston upon said right cylinder extending, and said right side second fluid room is expanded by said right piston upon said right cylinder contracting,
   said stabilizer further comprising:
   a parallel pipe communicating said left side first fluid room and said right side first fluid room, said parallel pipe communicating said left side second fluid room and said right side second fluid room;
   a cross pipe communicating said left side first fluid room and said right side second fluid room, said cross pipe communicating said left side second fluid room and said right side first fluid room;
   a parallel on-off valve which maintains a first communication between said left side first fluid room and said right side first fluid room and a second communication between said left side second fluid room and said right side second fluid room when opened, and which cuts off said first communication and said second communication when closed;
   a valve controller switching an opening/closing state of said parallel on-off valve based on a running state of said vehicle or an operation state of said vehicle by a driver;
   an accumulator communicated with said parallel pipe, said accumulator absorbing pressure variation of hydraulic oil in said cylinder device;
   an on-off valve for accumulator which maintains a third communication between said accumulator and said parallel pipe when opened, and which cuts off said third communication when closed; and
   an off-road running presumption means for presuming whether said vehicle is running on an off-road or not,
   wherein said valve controller is configured to make said parallel on-off valve in an opened state, and make said on-off valve for accumulator in a closed state, upon said off-road running presumption means presuming that said vehicle is running on an off-road, and
   wherein a flow resistance of said parallel pipe is smaller than that of said cross pipe.

2. The stabilizer according to claim 1, further comprising:
   a turning determination means for determining whether said vehicle is turning or not,
   wherein said valve controller is configured to make said parallel on-off valve in said opened state and make said on-off valve for accumulator in said closed state upon said off-road running presumption means presuming that said vehicle is running on an off-road, is configured to make said parallel on-off valve in a closed state and make said on-off valve for accumulator in said closed state upon said off-road running presumption means presuming that said vehicle is not running on an off-road and said turning determination means determining that said vehicle is turning, and is configured to make said parallel on-off valve in said opened state and make said on-off valve for accumulator in an opened state upon said turning determination means determining that said vehicle is not turning.

3. The stabilizer according to claim 1, wherein,
   said off-road running presumption means is configured to presume that said vehicle is running on an off-road based on a fact that a transmission is set in a gear range for off-road running.

4. A stabilizer, comprising:
a stabilizer bar provided between left-and-right wheels and a vehicle body; and
a cylinder device including a left cylinder and a right cylinder,
wherein said left cylinder and said right cylinder are disposed between said stabilizer bar and said vehicle body, at a left side and a right side in a vehicle width direction, respectively, and extend and contract when said stabilizer bar and said vehicle body vertically move relatively to each other, or
said left cylinder is disposed between said stabilizer bar and said left wheel to extend and contract when said stabilizer bar and said left wheel vertically move relatively to each other, and said right cylinder is disposed between said stabilizer bar and said right wheel to extend and contract when said stabilizer bar and said right wheel vertically move relatively to each other;
wherein, said left cylinder includes a left side first fluid room and a left side second fluid room which are partitioned by a left piston, wherein said left side first fluid room is compressed by said left piston upon said left cylinder contracting, and said left side first fluid room is expanded by said left piston upon said left cylinder extending, and wherein said left side second fluid room is compressed by said left piston upon said left cylinder extending, and said left side second fluid room is expanded by said left piston upon said left cylinder contracting; and
said right cylinder includes a right side first fluid room and a right side second fluid room which are partitioned by a right piston, wherein said right side first fluid room is compressed by said right piston upon said right cylinder contracting, and said right side first fluid room is expanded by said right piston upon said right cylinder extending, and wherein said right side second fluid room is compressed by said right piston upon said right cylinder extending, and said right side second fluid room is expanded by said right piston upon said right cylinder contracting,
said stabilizer further comprising:
  a parallel pipe communicating said left side first fluid room and said right side first fluid room, said parallel pipe communicating said left side second fluid room and said right side second fluid room;
  a cross pipe communicating said left side first fluid room and said right side second fluid room, said cross pipe communicating said left side second fluid room and said right side first fluid room;
  a parallel on-off valve which maintains a first communication between said left side first fluid room and said right side first fluid room and a second communication between said left side second fluid room and said right side second fluid room when opened, and which cuts off said first communication and said second communication when closed;
  a valve controller switching an opening/closing state of said parallel on-off valve based on a running state of said vehicle or an operation state of said vehicle by a driver;
  an accumulator communicated with said parallel pipe, said accumulator absorbing pressure variation of hydraulic oil in said cylinder device;
  an on-off valve for accumulator which maintains a third communication between said accumulator and said parallel pipe when opened, and which cuts off said third communication when closed; and
  a low-speed determining means for determining whether said vehicle speed is lower than predetermined low-speed determining vehicle speed,
wherein said valve controller is configured to make said parallel on-off valve in an opened state and make said on-off valve for accumulator in a closed state upon said low-speed determining means determining that said vehicle speed is lower than said low-speed determining vehicle speed,
wherein a flow resistance of said parallel pipe is smaller than that of said cross pipe.

5. The stabilizer according to claim 4, further comprising:
a turning determination means for determining whether said vehicle is turning or not, wherein said valve controller is configured to make said parallel on-off valve in said opened state and make said on-off valve for accumulator in said closed state upon said low-speed determining means determining that said vehicle speed is lower than said low-speed determining vehicle speed, is configured to make said parallel on-off valve in a closed state and make said on-off valve for accumulator in said closed state upon said low-speed determining means determining that said vehicle speed is not lower than said low-speed determining vehicle speed and said turning determination means determining that said vehicle is turning, and is configured to make said parallel on-off valve in said closed state and make said on-off valve for accumulator in an opened state upon said turning determination means determining that said vehicle is not turning.

* * * * *